United States Patent
Torigoe et al.

(10) Patent No.: US 9,268,480 B2
(45) Date of Patent: *Feb. 23, 2016

(54) COMPUTER-READABLE STORAGE MEDIUM, APPARATUS, SYSTEM, AND METHOD FOR SCROLLING IN RESPONSE TO AN INPUT

(75) Inventors: Nobutaka Torigoe, Kyoto (JP); Eriko Kimura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 617 days.

This patent is subject to a terminal disclaimer.

(21) Appl. No.: 13/312,141

(22) Filed: Dec. 6, 2011

(65) Prior Publication Data

US 2012/0167002 A1    Jun. 28, 2012

(30) Foreign Application Priority Data

Dec. 7, 2010   (JP) ................................. 2010-272974

(51) Int. Cl.
*G06F 3/0485*    (2013.01)
*G06F 3/0488*    (2013.01)

(52) U.S. Cl.
CPC ............ *G06F 3/0488* (2013.01); *G06F 3/0485* (2013.01)

(58) Field of Classification Search
CPC .............................. G06F 3/0485; G06F 3/0488
USPC .................................... 715/784, 786; 345/684
See application file for complete search history.

(56) References Cited

U.S. PATENT DOCUMENTS

| 5,553,225 | A | * | 9/1996 | Perry .............................. 715/786 |
| 5,611,060 | A | * | 3/1997 | Belfiore et al. ............... 715/819 |
| 6,057,840 | A | * | 5/2000 | Durrani et al. ................ 715/786 |
| 2004/0100479 | A1 | | 5/2004 | Nakano et al. |
| 2004/0141009 | A1 | * | 7/2004 | Hinckley et al. ............... 345/786 |
| 2008/0082940 | A1 | * | 4/2008 | Morris .......................... 715/786 |
| 2010/0201644 | A1 | | 8/2010 | Ohshita |

FOREIGN PATENT DOCUMENTS

| JP | 2003-330613 | 11/2003 |
| JP | 2009-301509 | 12/2009 |
| JP | 2010-182197 | 8/2010 |
| WO | 2010/107661 | 9/2010 |

OTHER PUBLICATIONS

Jan. 4, 2013 Search Report for EP 11191946.0, 8 pages.

* cited by examiner

*Primary Examiner* — Aaron Lowenberger
(74) *Attorney, Agent, or Firm* — Nixon & Vanderhye, P.C.

(57) ABSTRACT

When it is determined that a touch position by a user has shifted on a scroll image display region in a direction different from a first direction (scrolling direction), a scroll target image is scrolled and displayed in the first direction (scrolling direction).

13 Claims, 12 Drawing Sheets

COMPUTER-READABLE STORAGE MEDIUM, APPARATUS, SYSTEM, AND METHOD FOR SCROLLING IN RESPONSE TO AN INPUT

CROSS REFERENCE TO RELATED APPLICATION

The disclosure of Japanese Patent Application No. 2010-272974, filed on Dec. 7, 2010, is incorporated herein by reference.

FIELD

The exemplary embodiments disclosed herein relate to a computer-readable storage medium having an information processing program stored therein, an information processing apparatus, an information processing system, and an information processing method, and more particularly, relate to a computer-readable storage medium having stored therein an information processing program executed by an information processing apparatus, an information processing apparatus, an information processing system, and an information processing method, which perform information processing corresponding to an operation performed by a user with input means.

BACKGROUND AND SUMMARY

Conventionally, when an image larger than the display area of a display section is displayed, the image is scrolled and displayed in accordance with a scroll operation. Thus, for example, a scroll instruction region (drag operation region) where a scroll operation is possible may be provided in the display section.

Meanwhile, in order to perform, on an image displayed on the display area, a process such as a selection operation of selecting a part of the image, an operation region for this operation has to be provided in the display area. Therefore, the above scroll instruction region has to be located in a region other than the operation region, and is normally provided out of the display area (the display area on which an image is scrolled and displayed). Meanwhile, in recent years, information processing apparatuses have been decreased in size, and their display sections also have been decreased in size. Thus, it is desired to increase the proportion of the display area in the display section. In such a case, a region other than an operation region where an operation is performed on an image displayed on the display area is decreased in size, and this leads to a decreased region where a scroll instruction region can be located. Therefore, the region where the scroll instruction region can be located is short in the scrolling direction, and it is difficult to perform a drag process in the scrolling direction which is performed in conventional scrolling technology.

Therefore, a feature of certain exemplary embodiments is to provide a computer-readable storage medium having an information processing program stored therein, an information processing apparatus, an information processing system, and an information processing method which allow a scroll operation to be performed with good operability even in a situation where a scroll instruction region is short in a scrolling direction.

Certain exemplary embodiments have the following features to attain the object mentioned above. It is noted that descriptions in parentheses are merely provided to facilitate the understanding of certain exemplary embodiments in relation to later-described embodiments, rather than limiting the scope of certain exemplary embodiments in any way.

An aspect of certain exemplary embodiments is configured as a computer-readable storage medium having stored therein an information processing program executed by a computer of an information processing apparatus which includes a scroll image display region for displaying a scroll target image. The information processing program causes the computer to operate as pointed position detector, scroll instruction determination section, and scrolling controller. The pointed position detector is configured to sequentially detect a pointed position on the scroll image display region by a user. The scroll instruction determination section is configured to determine whether or not the pointed position detected by the pointed position detector has shifted in the scroll image display region in a direction different from a first direction. The scrolling controller is configured to scroll the scroll target image in the first direction when a result of the determination of the scroll instruction determination section is positive.

According to this configuration, the user can cause the scroll target image to be scrolled and displayed in the first direction (to move with respect to the scroll image display region in the direction opposite to the first direction), by moving the pointed position in the scroll image display region in the direction different from first direction (scrolling direction). Therefore, even when the proportion of the scroll image display region in a display section increases, the scroll target image can be scrolled and displayed in the scrolling direction, since the pointed position can be moved in the scroll image display region in the direction different from first direction.

The scroll image display region may include a first region which is used for a scroll instruction and a second region which is used for another instruction, and the first region may be located in the first direction (a y-axis positive direction shown in FIG. 5) with respect to the second region. In this case, the scroll instruction determination section determines whether or not the pointed position detected by the pointed position detector has shifted in the first region in the direction different from the first direction.

This configuration is characterized in that when a region where the first region (a scroll instruction region) can be located is limited to be small, for example, as in the case where the scroll image display region and the second region (e.g., a selection operation region for selecting a part of an image) located within this region occupy a great portion in the display section, the scroll instruction region is located within the scroll image display region. According to this configuration, the user can cause the scroll target image to be scrolled and displayed in the first direction (to move with respect to the scroll image display region in the direction opposite to the first direction), by moving the pointed position in the scroll instruction region located within the scroll image display region, in the direction different from the first direction (scrolling direction). Therefore, even when the scroll image display region is increased in size in the display section and the selection operation region in the scroll image display region is increased in size, the scroll target image can be scrolled and displayed in the scrolling direction, as long as the region, in the direction different from the scrolling direction, of the scroll instruction region located within the scroll image display region is ensured.

The information processing program may further cause the computer to operate as scrolling amount setter configured to set a scrolling amount by which the scroll target image is to be scrolled in the first direction. The scrolling amount setter sets the scrolling amount on the basis of a shift amount by which the pointed position detected by the pointed position detector has shifted in the first region in the direction different from the first direction. The scrolling controller scrolls the scroll target image in the first direction by the scrolling amount which is set by the scrolling amount setter.

According to this configuration, by shifting the pointed position in the direction different from the first direction (scrolling direction) in the first region (a scroll instruction region) located within the scroll image display region, the user can cause the scroll target image to be scrolled and displayed in the first direction (to move with respect to the scroll image display region in the direction opposite to the first direction) by a scrolling amount corresponding to the shift amount. Therefore, the user can adjust the amount of scrolling, as long as the region, in the direction different from the scrolling direction, of the scroll instruction region is ensured.

The process by the scrolling amount setter may be as follows. Specifically, the scrolling amount setter sets a scrolling amount by which scrolling is to be performed per unit time, on the basis of a shift amount by which the pointed position detected by the pointed position detector has shifted in the first region in the direction different from the first direction. In this case, the scrolling controller scrolls the scroll target image in the first direction by the scrolling amount which is set by the scrolling amount setter, per unit time.

According to this configuration, by shifting the pointed position in the direction different from the first direction (scrolling direction) in the first region (a scroll instruction region) located within the scroll image display region, the user can cause the scroll target image to be scrolled and displayed in the first direction (to move with respect to the scroll image display region in the direction opposite to the first direction) by an amount which corresponds to the shift amount and by which scrolling is to be performed per unit time (i.e., at a predetermined speed). Therefore, the user can adjust the speed of scrolling, as long as the region, in the direction different from the scrolling direction, of the scroll instruction region is ensured.

The process by the scrolling amount setter may be as follows. Specifically, the scrolling amount setter sets the scrolling amount in accordance with a length of a track on which the pointed position detected by the pointed position detector has moved in the first region from a predetermined reference position in the direction different from the first direction.

According to this configuration, also by reciprocating the pointed position in the direction different from the first direction (scrolling direction) in the first region (scroll instruction region) located within the scroll image display region, the user can increase the length of a track on which the pointed position moves in the direction different from the first direction. Thus, even when a region where it is possible to move the pointed position in the direction different from the first direction is small, it is possible to increase the length of the track by repeating the reciprocation of the pointed position, and thus it is possible to increase the scrolling amount which is set in accordance with the length (e.g., to increase the speed of scrolling).

The process by the scrolling amount setter may be as follows. Specifically, the scrolling amount setter sets the scrolling amount in accordance with a shift amount by which the pointed position detected by the pointed position detector has shifted in the first region from a predetermined reference position in the direction different from the first direction.

According to this configuration, by changing a distance by which the pointed position moves from the predetermined reference position in the direction different from the first direction (scrolling direction) in the first region (scroll instruction region) located within the scroll image display region, the user can change the scrolling amount which is set in accordance with the distance. Therefore, the user can keep the scrolling amount (e.g., the speed of scrolling) constant by keeping the pointed position at a certain point without continuously moving the pointed position.

The process by the scrolling amount setter may be as follows. Specifically, the scrolling amount setter sets the scrolling amount in accordance with a shift amount by which the pointed position detected by the pointed position detector has shifted in the first region in the direction different from the first direction within a predetermined time.

According to this configuration, by changing a speed at which the pointed position moves in the direction different from the first direction (scrolling direction) in the first region (scroll instruction region) located within the scroll image display region, the user can change the scrolling amount which is set in accordance with the speed. In other words, the user can change the scrolling amount (e.g., the speed of scrolling) by an intuitive operation in which when the pointed position is moved fast, the scrolling amount increases.

The process by the scroll instruction determination section may be as follows. Specifically, the scroll instruction determination section determines whether or not the pointed position detected by the pointed position detector has shifted in the first region in the direction different from the first direction within a predetermined time by an amount exceeding a predetermined threshold.

According to this configuration, by moving the pointed position at a predetermined speed or higher in the direction different from the first direction (scrolling direction) in the first region (scroll instruction region) located within the scroll image display region, the user can cause the scroll target image to be scrolled and displayed in the first direction (to move with respect to the scroll image display region in the direction opposite to the first direction). Therefore, it can be avoided that scroll display is performed when the user can be considered not to intend to increase the speed of scroll display as in the case where the user slowly moves the pointed position in the direction different from the first direction.

The direction different from the first direction may be a direction orthogonal to the first direction.

In general, in order to increase the size of a displayed portion of the scroll target image as much as possible, it is desired to increase the size of the scroll image display region in the scrolling direction. In such a case, the second region (e.g., a selection operation region for selecting a part of an image) within the scroll image display area also has to be increased in size in the scrolling direction, and thus the length (width) of the first region (scroll instruction region) in the scrolling direction is shortened. However, the length (width) of the scroll instruction region in the direction orthogonal to the scrolling direction is not shortened. According to this configuration, the length (width), in the direction orthogonal to the scrolling direction, of the scroll instruction region located within the scroll image display region is sufficient for the user to move the pointed position, and thus the user can cause scroll display to be performed with good operability, by moving the pointed position in this direction.

In the above description, certain exemplary embodiments are configured as a computer-readable storage medium having stored therein an information processing program executed by a computer of an information processing apparatus. However, certain exemplary embodiments may be configured as an information processing apparatus, an information processing system, or an information processing method.

According to certain exemplary embodiments, a computer-readable storage medium having an information processing program stored therein, an information processing apparatus, an information processing system, and an information processing method which allow scrolling to be performed in accordance with an intuitive and easy-to-perform drag operation in a scrolling direction and also allow scroll display to be performed at a higher speed, can be provided.

These and other objects, features, aspects and advantages of certain exemplary embodiments will become more apparent from the following detailed description of certain exemplary embodiments when taken in conjunction with the accompanying drawings.

DETAILED DESCRIPTION OF NON-LIMITING EXAMPLE EMBODIMENTS

Hereinafter, with reference to the drawings, an information processing apparatus according to an exemplary embodiment will be described. It is noted that the information processing apparatus of the exemplary embodiments disclosed herein, and an information processing program executed by the information processing apparatus are applicable to any computer system. In the exemplary embodiment, a case where a handheld game apparatus 10 which is an example of the information processing apparatus executes an information processing program stored in an external memory 45 will be described as an example.

[Configuration of Game Apparatus 10]

Figure 1:
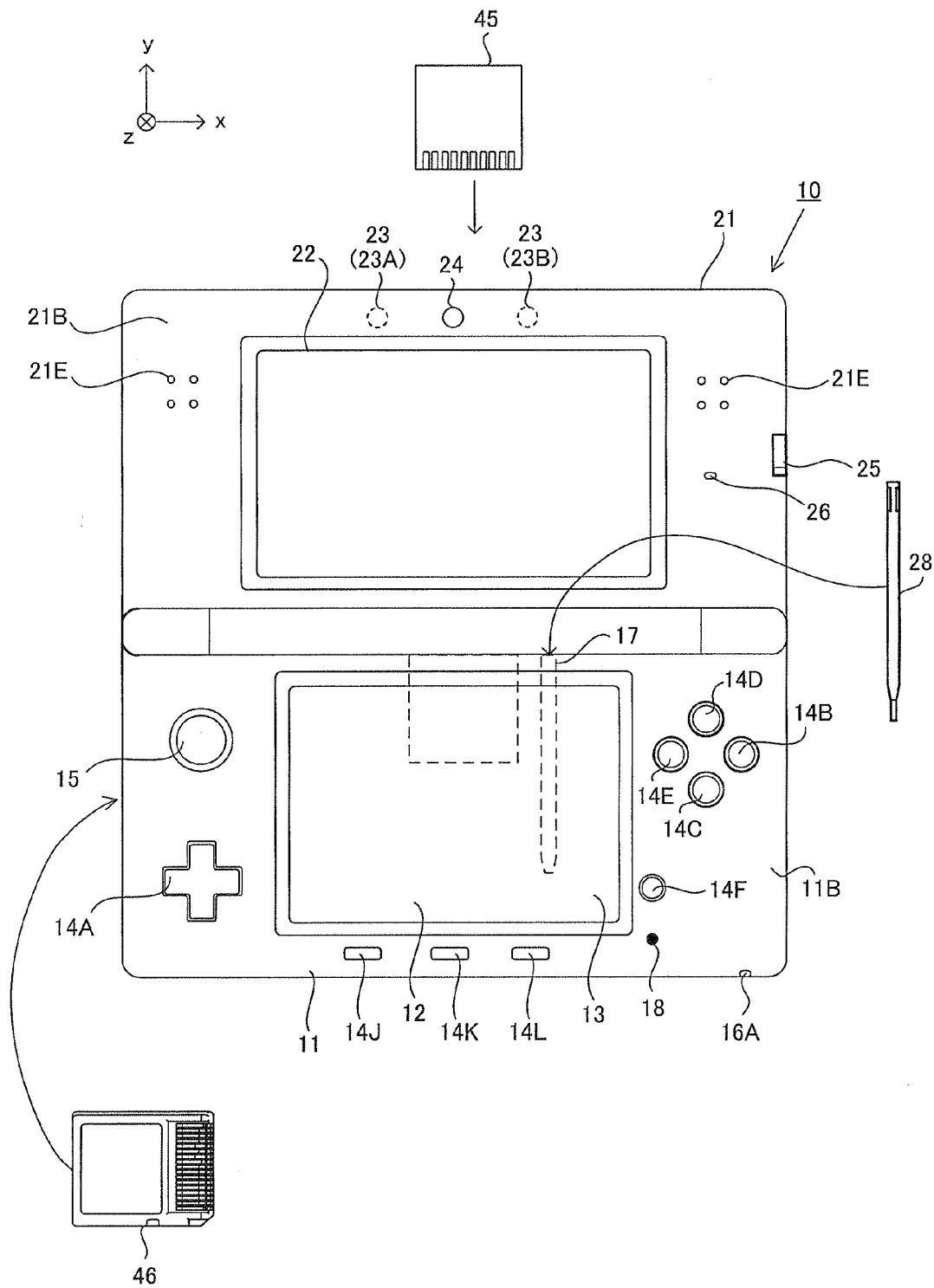
FIG. 1 is a front view of a non-limiting example of a game apparatus 10 in an opened state.
Figure 2:
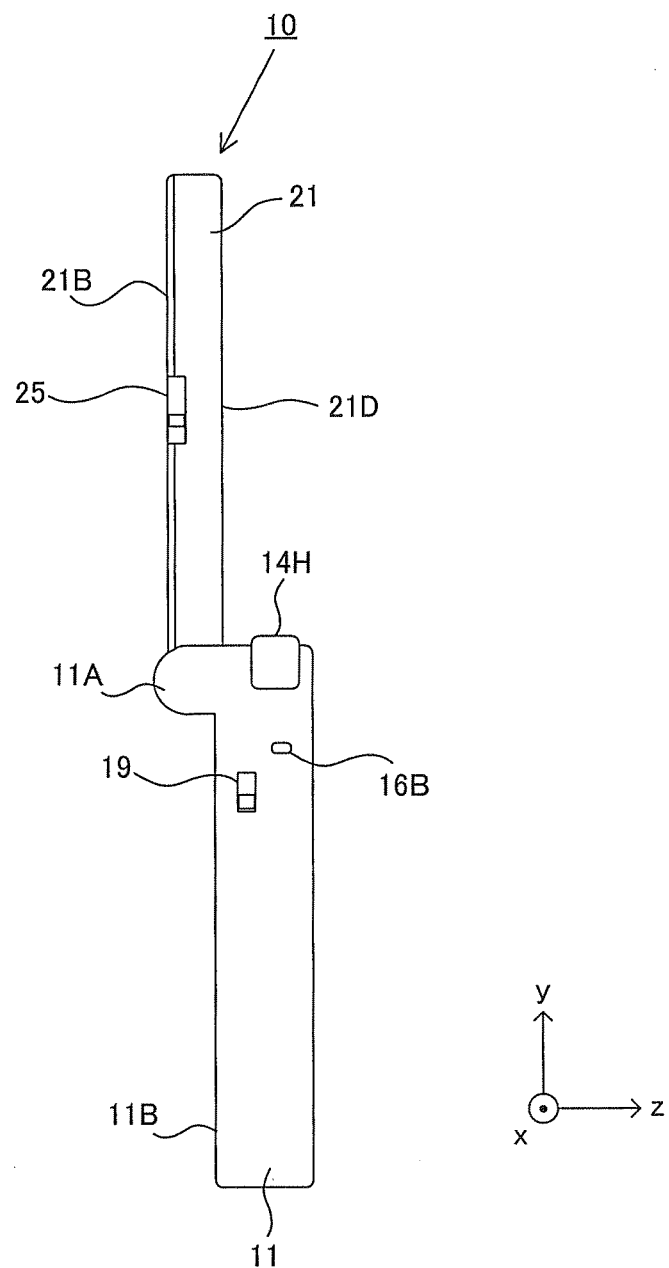
FIG. 2 is a right side view of a non-limiting example of the game apparatus 10 in an opened state.
Figure 3:
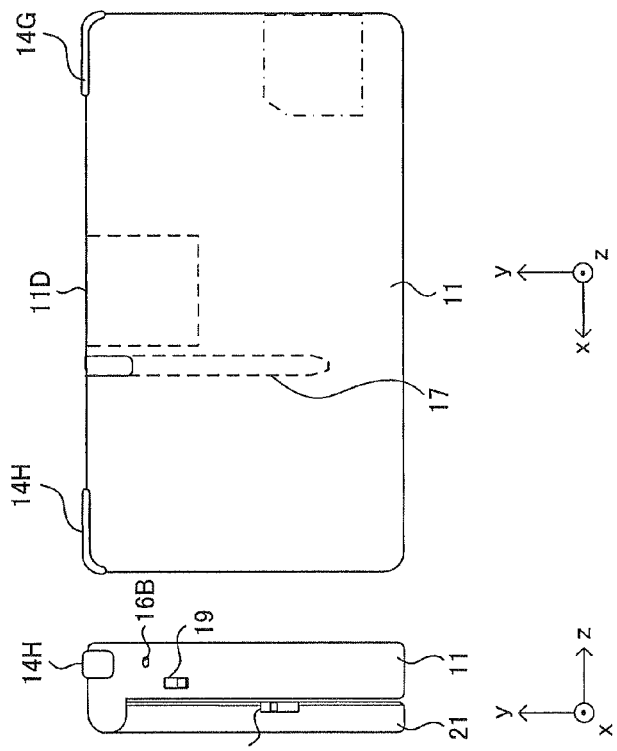
FIG. 3A is a left side view of a non-limiting example of the game apparatus 10 in a closed state.
FIG. 3B is a front view of a non-limiting example of the game apparatus 10 in a closed state.
FIG. 3C is a right side view of a non-limiting example of the game apparatus 10 in a closed state.
FIG. 3D is a rear view of a non-limiting example of the game apparatus 10 in a closed state.

FIG. 1 is a front view of the game apparatus 10 in an opened state. FIG. 2 is a right side view of the game apparatus 10 in the opened state. FIG. 3A is a left side view of the game apparatus 10 in a closed state. FIG. 3B is a front view of the game apparatus 10 in the closed state. FIG. 3C is a right side view of the game apparatus 10 in the closed state. FIG. 3D is a rear view of the game apparatus 10 in the closed state.

The game apparatus 10 includes an imaging section for shooting an image, and is able to display a shot image on a screen and save data of the shot image. In addition, the game apparatus 10 can execute a program which is stored in an exchangeable memory card (external memory 45), or a program which is received from a server or another game apparatus. By executing these programs, the game apparatus 10 can also display, on the screen, an image that is generated by performing computer graphics processing for an image shot by a virtual camera set in a virtual space.

The game apparatus 10 includes a lower housing 11 and an upper housing 21. The lower housing 11 and the upper housing 21 are connected to each other so as to be openable and closable. Therefore, the game apparatus 10 can be folded. The game apparatus 10 is used in an opened state as shown in FIG. 1. When the game apparatus 10 is not used, the game apparatus 10 is kept in a closed state (see FIGS. 3A to 3D).

[Configuration of Lower Housing 11]

In the lower housing 11, a lower LCD (Liquid Crystal Display) 12, a touch panel 13, operation buttons 14A to 14L (FIGS. 1 and 3A to 3D), an analog stick 15, an LED 16A and an LED 16B, an insertion opening 17, and a microphone hole 18 are provided.

The lower LCD 12 has a display screen whose length in the right-left direction (x-axis direction) is longer than the length in the up-down direction (y-axis direction), and is provided at the center of an inner side surface 11B of the lower housing 11. The number of pixels of the lower LCD 12 is, as one example, 320 dots×240 dots (the longitudinal line×the vertical line), which is not limited thereto. The lower LCD 12 is a display device for displaying an image in a planar manner (not in a stereoscopically visible manner), which is different from the upper LCD 22 as described below.

It is noted that although an LCD is used as a display device in the exemplary embodiment, any other display device such as a display device using an EL (Electro Luminescence), or the like may be used.

As shown in FIG. 1, the game apparatus 10 includes the touch panel 13 which functions as input means. The touch panel 13 is mounted on the screen of the lower LCD 12 in such a manner as to cover the screen. In the exemplary embodiment, the touch panel 13 may be, but is not limited to, a resistive film type touch panel. A touch panel of any press type such as electrostatic capacitance type may be used. In the exemplary embodiment, the touch panel 13 has the same resolution (detection accuracy) as that of the lower LCD 12. However, the resolution of the touch panel 13 and the resolution of the lower LCD 12 may not necessarily be the same.

The insertion opening 17 (indicated by dashed lines in FIGS. 1 and 3D) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14L, a cross button 14A, a button 14B, a button 14C, a button 14D, a button 14E, a power button 14F, a selection button 14J, a HOME button 14K, and a start button 14L are provided on the inner side surface 11B of the lower housing 11. The buttons 14A to 14E, the selection button 14J, the HOME button 14K, and the start button 14L are respectively assigned with functions in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 on the inner side surface 11B of the lower housing 11. The analog stick 15 and the cross button 14A are positioned so as to be operated by a thumb of the user's left hand holding the lower housing 11. The analog stick 15 has a keytop that slides in parallel to the inner side surface 11B of the lower housing 11. The analog stick 15 serves as respective functions corresponding to programs executed by the game apparatus 10.

The microphone hole 18 is provided on the inner side surface 11B of the lower housing 11. Though will be described later, a microphone 43 (see FIG. 4) is provided, as a sound input device, inside the lower housing 11, so as to correspond to the position of the microphone hole 18. A sound inputted via the microphone hole 18 is detected by the microphone 43.

As shown in FIGS. 3B and 3D, an L button 14G and an R button 14H are provided on the upper side surface of the lower housing 11. The L button 14G is positioned on the left end portion of the upper side surface of the lower housing 11 and the R button 14H is positioned on the right end portion of the upper side surface of the lower housing 11. The L button 14G and the R button 14H function as, for example, shutter buttons (photographing instruction buttons) of the imaging section. Further, as shown in FIG. 3A, a sound volume button 14I is provided on the left side surface of the lower housing 11. The sound volume button 14I is used for adjusting a sound volume of a speaker 44 (see FIG. 4) of the game apparatus 10.

As shown in FIG. 3A, a cover section 11C is provided on the left side surface of the lower housing 11 so as to be openable and closable. Inside the cover section 11C, a connector (not shown) is provided for electrically connecting the game apparatus 10 to an external data storage memory 46 (see FIG. 1). The external data storage memory 46 is detachably connected to the connector. The external data storage memory 46 is used for, for example, recording (storing) data of an image taken by the game apparatus 10. The connector and the cover section 11C may be provided on the right side surface of the lower housing 11.

As shown in FIG. 3D, an insertion opening 11D is provided on the upper side surface of the lower housing 11. An external memory 45 (see FIG. 1) that is a storage medium having an information processing program stored therein is inserted into the insertion opening 11D. A connector (not shown) for connecting the game apparatus 10 to the external memory 45 in a detachable manner is provided inside the insertion opening 11D. The external memory 45 is attached to the connecter, whereby the external memory 45 and the game apparatus 10 are electrically connected, and then the information processing program is executed. It is noted that the connector and the insertion opening 11D may be provided on another side surface (for example, the right side surface) of the lower housing 11.

As shown in FIG. 1, a first LED 16A is provided on the lower side surface of the lower housing 11. The first LED 16A notifies a user of an ON/OFF state of a power supply of the game apparatus 10. As shown in FIG. 3C, a second LED 16B is provided on the right side surface of the lower housing 11. The game apparatus 10 is configured to allow wireless communication with other devices. The second LED 16B notifies a user of an establishment state of a wireless communication of the game apparatus 10, and lights up when the wireless communication is established with another device. The game apparatus 10 has a function of connecting to a wireless LAN in a method based on, for example, IEEE802.11.b/g standard. A wireless switch 19 for enabling/disabling the function of the wireless communication is provided on the right side surface of the lower housing 11 (see FIG. 3C).

[Configuration of Upper Housing 21]

In the upper housing 21, an upper LCD (Liquid Crystal Display) 22, two outer imaging sections 23 (a outer left imaging section 23A and a outer right imaging section 23B), an inner imaging section 24, a 3D adjustment switch 25, and a 3D indicator 26 are provided.

As shown in FIG. 1, the upper LCD 22 is provided on the inner side surface (main surface) 21B of the upper housing 21. The upper LCD 22 has a display screen whose length in the lateral direction is longer than the length in the longitudinal direction, and is provided at the center of the upper housing 21. The number of pixels of the upper LCD 22 is, as one example, 800 dots×240 dots (the longitudinal line×the vertical line), which is not limited thereto. It is noted that although, in the exemplary embodiment, the upper LCD 22 is an LCD, a display device using an EL (Electro Luminescence), or the like may be used.

The upper LCD 22 is a display device capable of displaying a stereoscopically visible image. The upper LCD 22 can display an image for a left eye and an image for a right eye by using substantially the same display area.

As shown in FIG. 3B, the outer imaging section 23 is provided on the outer side surface (the back surface reverse of the main surface on which the upper LCD 22 is provided) 21D of the upper housing 21. The outer imaging section 23 includes the outer left imaging section 23A and the outer right imaging section 23B.

The imaging directions of the outer left imaging section 23A and the outer right imaging section 23B are each the same as the outward normal direction of the outer side surface 21D. In addition, the imaging direction of the outer left imaging section 23A and the imaging direction of the outer right imaging section 23B are parallel to each other. The outer left imaging section 23A and the outer right imaging section 23B can be used as a stereo camera depending on a program executed by the game apparatus 10.

The inner imaging section 24 is provided on the inner side surface (main surface) 21B of the upper housing 21, and serves as an imaging section which takes an image in the direction opposite to that of the outer imaging section 23. Thus, when a user views the upper LCD 22 from the front thereof, the inner imaging section 24 can take an image of the face of the user from the front thereof. The inner imaging section 24 includes an imaging device, such as a CCD image sensor or a CMOS image sensor, having a predetermined resolution, and a lens. The lens may have a zooming mechanism.

As shown in FIGS. 1, 2, and 3C, a 3D adjustment switch 25 is provided at the end portions of the inner side surface and the right side surface of the upper housing 21. The 3D adjustment switch 25 is used for adjusting the stereoscopic effect of a stereoscopically visible image (stereoscopic image) which is displayed on the upper LCD 22.

As shown in FIG. 1, the 3D indicator 26 is positioned on the inner side surface 21B of the upper housing 21. The 3D indicator 26 indicates whether or not the upper LCD 22 is in a stereoscopic display mode. The 3D indicator 26 is implemented as a LED, and is lit up when the stereoscopic display mode of the upper LCD 22 is enabled.

In addition, a speaker hole 21E is provided on the inner side surface 21B of the upper housing 21. A sound is outputted through the speaker hole 21E from a speaker 44 (see FIG. 4) described later.

[Internal Configuration of Game Apparatus 10]

Figure 4:
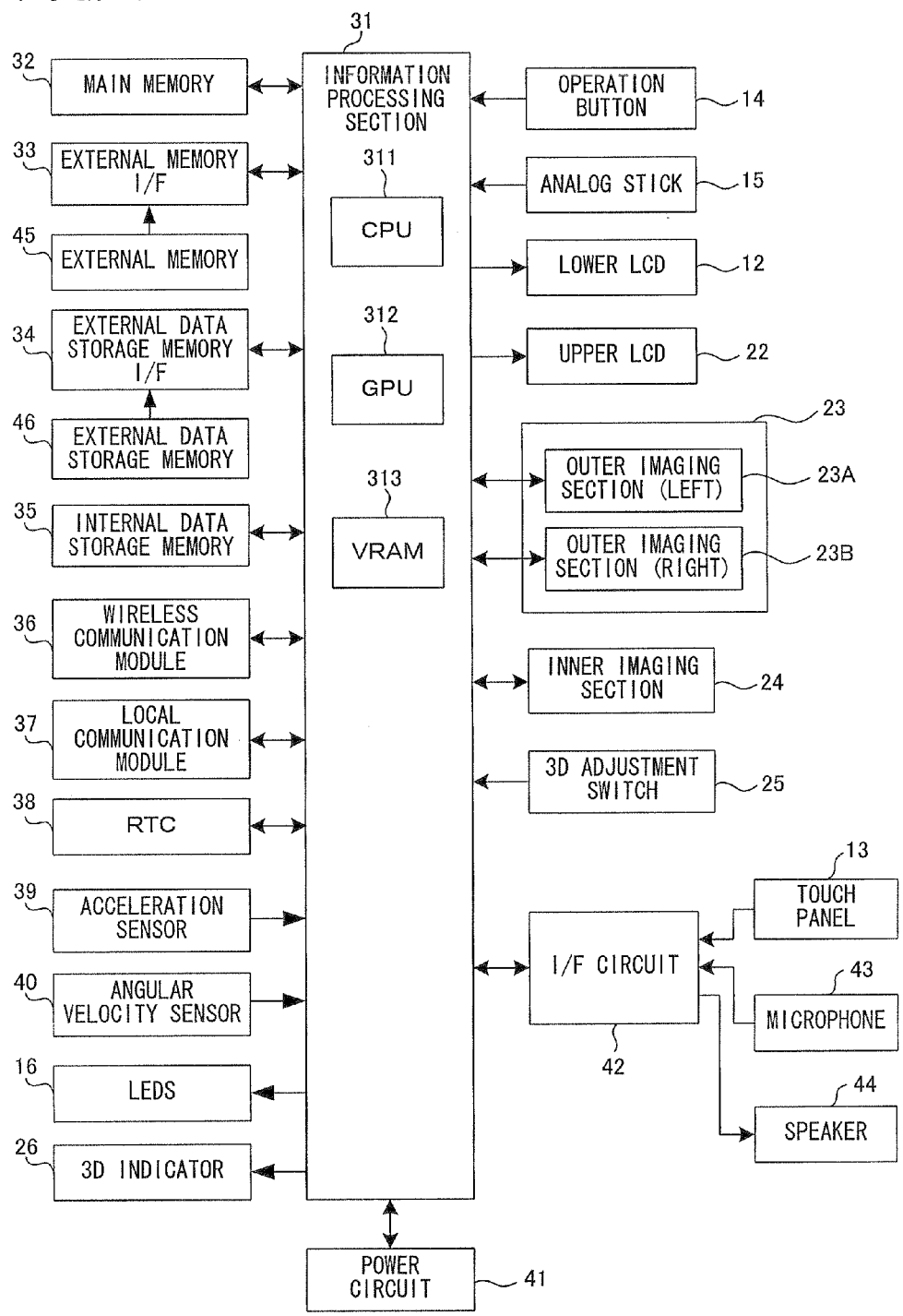
FIG. 4 is a block diagram illustrating a non-limiting example of an internal configuration of the game apparatus 10.

Next, an internal configuration of the game apparatus 10 will be described with reference to FIG. 4. FIG. 4 is a block diagram illustrating an example of an internal configuration of the game apparatus 10.

As shown in FIG. 4, the game apparatus 10 includes electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, an angular velocity sensor 40, a power supply circuit 41, an interface circuit (I/F circuit) 42, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. In the exemplary embodiment, an information processing program is stored in a memory (for example, the external memory 45 connected to the external memory I/F 33 or the internal data storage memory 35) inside the game apparatus 10. The CPU 311 performs information processing such as scrolling and displaying a scroll target image displayed on the display screen, by executing the information processing program. It is noted that the program executed by the CPU 311 may be obtained from another device through communication with the other device.

The information processing section 31 further includes a VRAM (Video RAM) 313. The GPU 312 renders an image in the VRAM 313 in accordance with an instruction from the CPU 311. The GPU 312 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 45. The external data storage memory I/F 34 is an interface for detachably connecting to the external data storage memory 46.

The main memory 32 is volatile storage means used as a work area and a buffer area for the CPU 311. That is, the main memory 32 temporarily stores various types of data used for the image processing and the game processing, and temporarily stores a program obtained from the outside (the external memory 45, another device, or the like), for example. In the exemplary embodiment, for example, a PSRAM (Pseudo-SRAM) is used as the main memory 32.

The external memory 45 is nonvolatile storage means for storing a program executed by the information processing section 31. The external memory 45 is implemented as, for example, a read-only semiconductor memory. When the external memory 45 is connected to the external memory I/F 33, the information processing section 31 can load a program stored in the external memory 45. A predetermined process is performed by the program loaded by the information processing section 31 being executed.

The external data storage memory 46 is implemented as a non-volatile readable and writable memory (for example, a NAND flash memory), and is used for storing predetermined data. For example, images taken by the outer imaging section 23 and/or images taken by another device are stored in the external data storage memory 46. When the external data storage memory 46 is connected to the external data storage memory I/F 34, the information processing section 31 loads an image stored in the external data storage memory 46, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method based on, for example, IEEE 802.11.b/g standard. The local communication module 37 has a function of performing wireless communication with the same type of game apparatus in a predetermined communication method (for example, infrared communication). The information processing section 31 can perform data transmission to and data reception from another device via the Internet by using the wireless communication module 36, and can perform data transmission to and data reception from the same type of another game apparatus by using the local communication module 37.

The acceleration sensor 39 detects magnitudes of accelerations (linear accelerations) in the directions of the straight lines along the three axial directions (xyz axial directions in the exemplary embodiment), respectively.

The angular velocity sensor 40 detects angular velocities generated around the three axes (xyz axes in the exemplary embodiment), respectively, of the game apparatus 10, and outputs data representing the detected angular velocities (angular velocity data) to the information processing section 31.

The RTC 38 and the power supply circuit 41 are connected to the information processing section 31. The RTC 38 counts time, and outputs the time to the information processing section 31. The information processing section 31 calculates a current time (date) based on the time counted by the RTC 38. The power supply circuit 41 controls power from the power supply (the rechargeable battery accommodated in the lower housing 11) of the game apparatus 10, and supplies power to each component of the game apparatus 10.

The microphone 43, the speaker 44, and the touch panel 13 are connected to the I/F circuit 42. Specifically, the speaker 44 is connected to the I/F circuit 42 through an amplifier which is not shown. The microphone 43 detects a voice from a user, and outputs a sound signal to the I/F circuit 42. The amplifier amplifies a sound signal outputted from the I/F circuit 42, and a sound is outputted from the speaker 44. The I/F circuit 42 includes a sound control circuit for controlling the microphone 43 and the speaker 44 (amplifier), and a touch panel control circuit for controlling the touch panel 13. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents coordinates of a position, on an input surface of the touch panel 13, on which an input is made (touch position). The touch panel control circuit reads a signal outputted from the touch panel 13, and generates the touch position data every predetermined time. The information processing section 31 obtains the touch position data, to recognize a touch position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 obtains the operation data from the operation button 14 to perform a process in accordance with the input on the operation button 14.

A user selects the imaging section to be used by performing a predetermined operation using the touch panel 13 and the operation buttons 14. In accordance with a result of the selection, the information processing section 31 instructs one of the outer imaging section 32 or the inner imaging section 24 to take an image. Whereas, the outer imaging section 23 and the inner imaging section 24 each take an image in accordance with an instruction from the information processing section 31, and output data of the taken image to the information processing section 31.

The lower LCD 12 and the upper LCD 22 each display an image in accordance with an instruction from the information processing section 31 (the GPU 312). For example, the information processing section 31 displays, on the upper LCD 22, a stereoscopic image (stereoscopically visible image) using an image for a right eye and an image for a left eye which are taken by the outer imaging section 23. In addition, the information processing section 31 displays, on the lower LCD 12, on a content selection screen including various images (icons) for starting predetermined programs. In addition, the information processing section 31 causes the lower LCD 12 to display, for example, various images (icons) for activating predetermined programs and an image (text) which is to be scrolled in accordance with an operation of the user. The configuration of the display screen of the lower LCD 12 will be described later in detail.

The 3D adjustment switch 25 outputs, to the information processing section 31, an electrical signal in accordance with the position of the slider. Whereas, the information processing section 31 (CPU 311) sets a display mode of the upper LCD 22, based on an electric signal from the 3D adjustment switch 25. The information processing section 31 controls whether or not the 3D indicator 26 is to be lit up. For example, the information processing section 31 lights up the 3D indicator 26 when the upper LCD 22 is in the stereoscopic display mode.

It is noted that the above-described configuration of hardware is merely an example, the configuration of the game apparatus 10 may be changed as appropriate.

[Configuration of Display Screen of Lower LCD 12]

Figure 5:
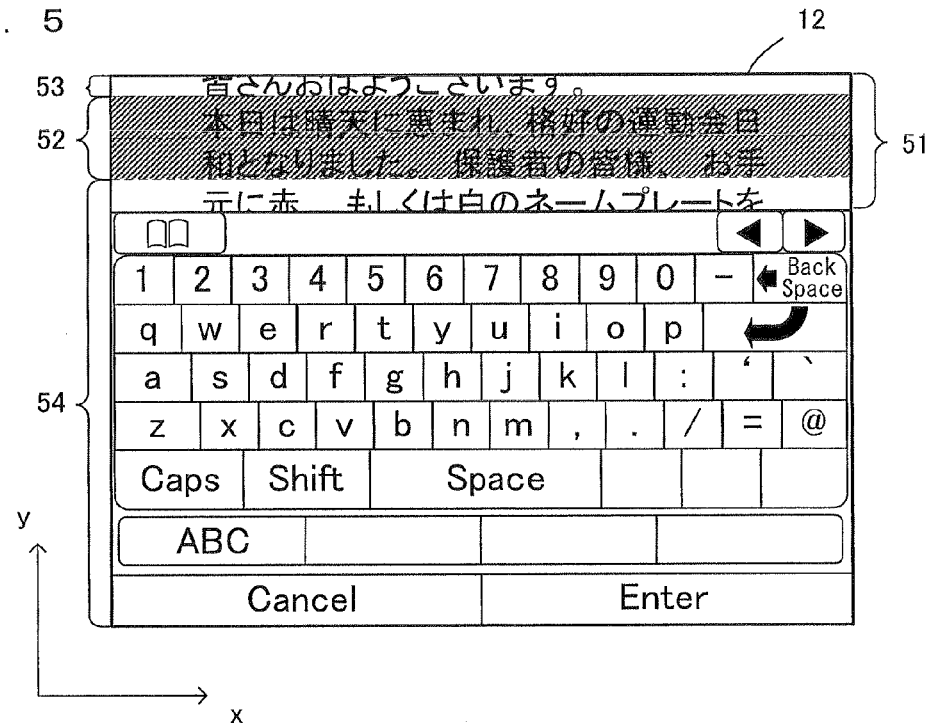
FIG. 5 is a diagram illustrating a non-limiting example of an image displayed on a display screen of a lower LCD 12.

FIG. 5 is a diagram illustrating an example of the configuration of the display screen of the lower LCD 12 and an image displayed on the display screen. As shown in FIG. 5, the display screen of the lower LCD 12 has a scroll image display region 51 for displaying a scroll target image. The scroll target image is an image (text) which is to be scrolled and displayed in the up-down direction (y-axis direction) in the scroll image display region 51 in accordance with later-described various operations performed by the user. In addition, various images are also displayed in the region of the display screen of the lower LCD 12 other than the scroll image display region 51. For example, an image of a software keyboard is displayed on the lower side of the scroll image display region 51, and a scroll target image (text) is displayed in the scroll image display region 51 on the basis of information inputted by the user touching the software keyboard.

Meanwhile, the display screen of the lower LCD 12 is composed of a selection operation region 52, an upper scroll instruction region 53, and a lower scroll instruction region 54. The upper scroll instruction region 53 is located on the upper side of the selection operation region 52, and the lower scroll instruction region 54 is located on the lower side of the selection operation region 52. The selection operation region 52 is a region for the user to perform a selection operation of selecting a part or the entirety of the scroll target image by using the touch pen 28. The upper scroll instruction region 53 is a region for the user to scroll the scroll target image in the upward direction by using the touch pen 28. The lower scroll instruction region 54 is a region for the user to scroll the scroll target image in the downward direction by using the touch pen 28. It is noted that the selection operation region 52 is a region for performing the selection operation on the scroll target image and thus is included in the scroll image display region 51.

[Various Operations by User]

Hereinafter, various operations in which the user touches the touch panel 13 by using the touch pen 28 will be described with reference to FIGS. 6 to 11. In the following description, an operation in which the user touches the touch panel 13 by using the touch pen 28 is referred to as "touch-on", and an operation in which the user separates the touch pen 28 from the touch panel 13 is referred to as "touch-off". For the convenience of explanation, unless otherwise specified herein, a touch-on being performed by the user on the touch panel 13 located directly above the display screen of the lower LCD 12 is referred to merely as a touch-on being performed on the display screen of the lower LCD 12. Similarly, a "touch position" on the touch panel 13 which is pointed by the touch pen 28 is referred to as "touch position" on the display screen of the lower LCD 12 located directly below the touch panel 13. Moreover, an operation in which the user performs a touch-on on the selection operation region 52 by using the touch pen 28 and moves the touch position (without performing a touch-off) is referred to as drag operation.

[Selection Process]

Figure 6:
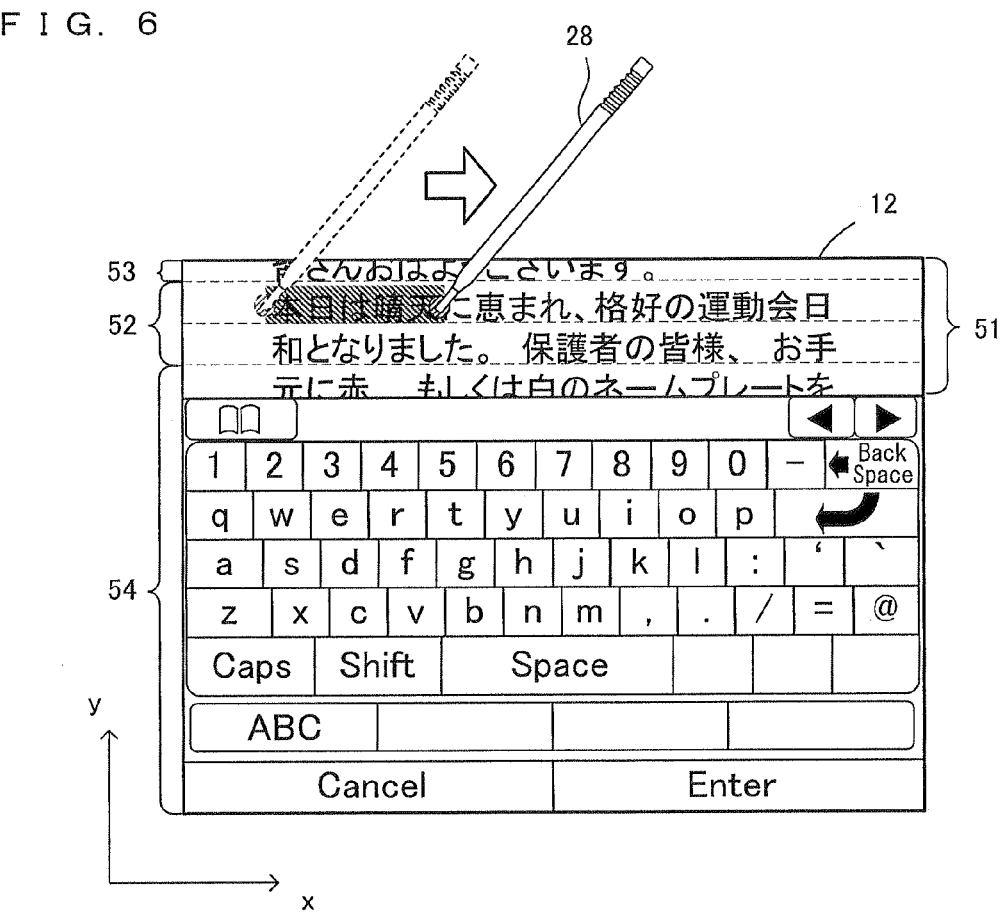
FIG. 6 is a diagram illustrating a non-limiting example of an operation performed by a user on the display screen of the lower LCD 12.

FIG. 6 illustrates a situation where the user performs a touch-on on the selection operation region 52 in the display screen of the lower LCD 12. As shown in FIG. 6, when the user performs a drag operation in the selection operation region 52, a part or the entirety of the scroll target image (text) displayed in the scroll image display region 51 is selected in accordance with the operation amount of the drag operation (the shift amount of the touch position). It is noted that when a touch-on is initially performed on the selection operation region 52, a selection process in which the scroll target image is selected as described above, and a later-described scroll process in which the scroll target image is scrolled and displayed in the up-down direction, are performed. When a touch-on is not initially performed on the selection operation region 52, neither the selection process nor the scroll process is performed even if the touch position shifts.

[Scroll Process]

FIGS. 7 to 12 illustrate situations where the user scrolls and displays the scroll target image displayed in the scroll image display region 51.

[First Downward Scroll Process]

Figure 7:
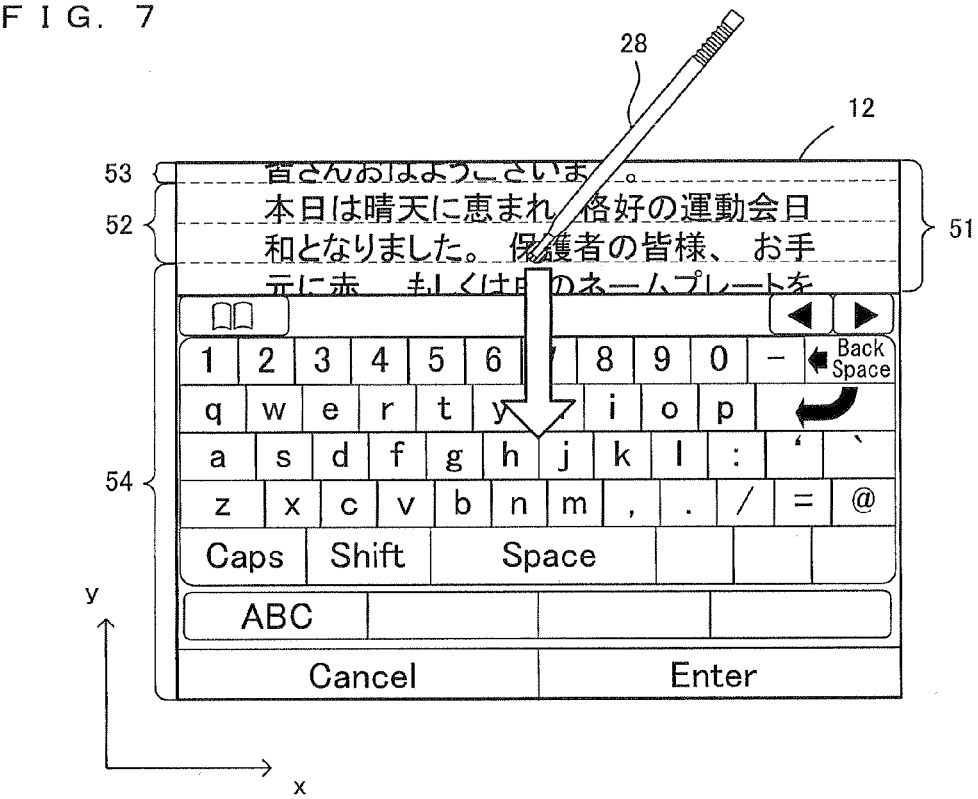
FIG. 7 is a diagram illustrating a non-limiting example of an operation performed by the user on the display screen of the lower LCD 12.
Figure 8:
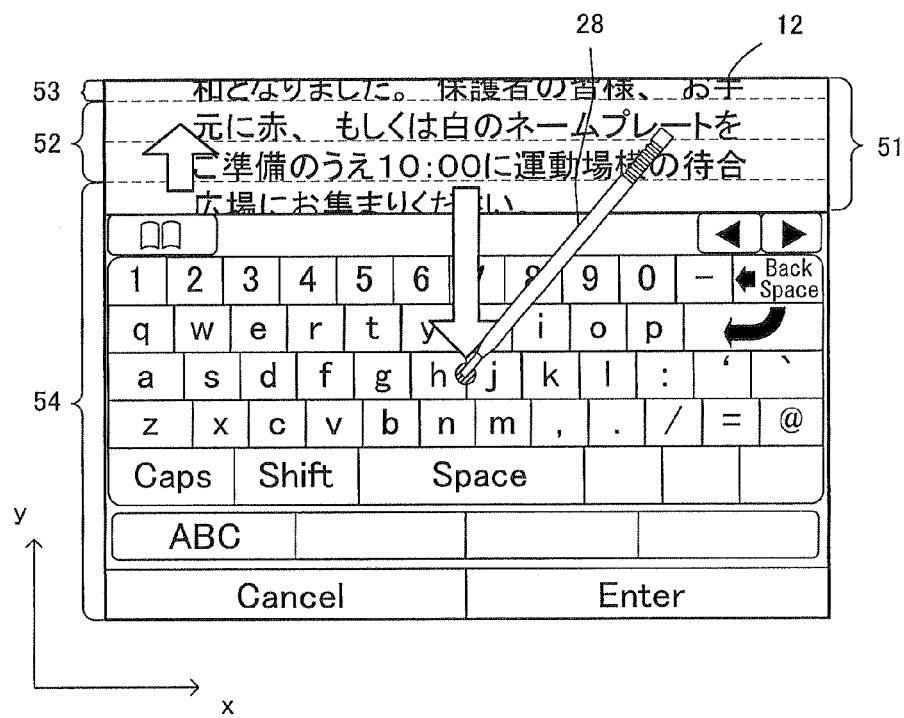
FIG. 8 is a diagram illustrating a non-limiting example of an operation performed by the user on the display screen of the lower LCD 12.

FIGS. 7 and 8 illustrate a situation where the user drags the touch pen 28 in the downward direction to scroll and display the scroll target image in the downward direction. As shown in FIG. 7, the user initially performs a touch-on on the selection operation region 52 by using the touch pen 28, and then drags the touch pen 28 in the downward direction to move the touch position onto the lower scroll instruction region 54. At that time, as shown in FIG. 8, the scroll target image displayed in the scroll image display region 51 is scrolled and displayed in the downward direction (i.e., the scroll target image relatively moves with respect to the scroll image display region 51 in the upward direction). It is noted that the speed of scrolling is set, for example, in accordance with a shift amount by which the touch position on the lower scroll instruction region 54 has shifted from the lower edge of the selection operation region 52 (the boundary between the selection operation region 52 and the lower scroll instruction region 54) in the downward direction (in the y-axis negative direction).

[First Upward Scroll Process]

Figure 9:
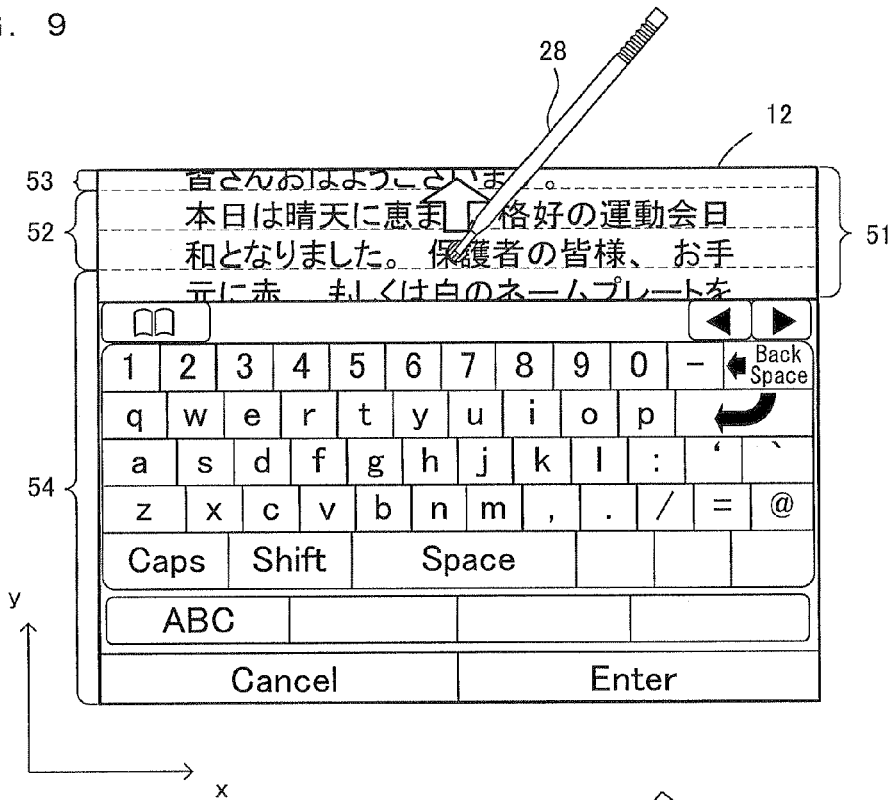
FIG. 9 is a diagram illustrating a non-limiting example of an operation performed by the user on the display screen of the lower LCD 12.
Figure 10:
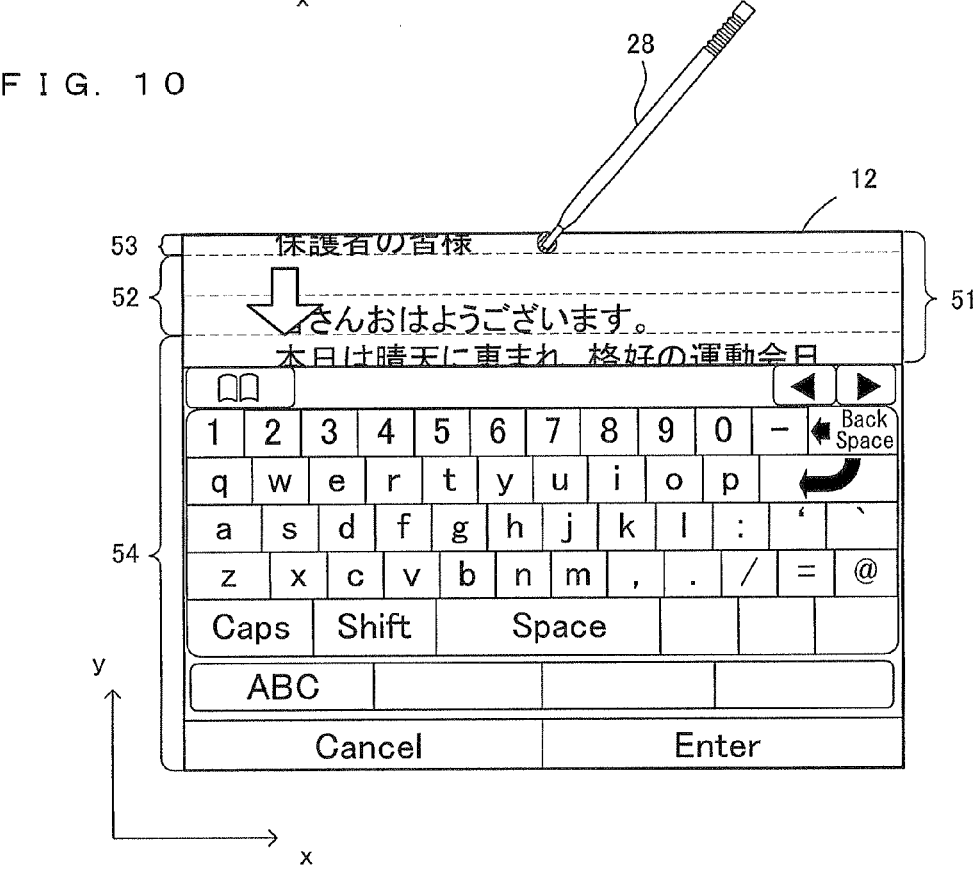
FIG. 10 is a diagram illustrating a non-limiting example of an operation performed by the user on the display screen of the lower LCD 12.

FIGS. 9 and 10 illustrate a situation where the user drags the touch pen 28 in the upward direction to scroll and display the scroll target image in the upward direction. As shown in FIG. 9, the user initially performs a touch-on on the selection operation region 52 by using the touch pen 28, and then drags the touch pen 28 in the upward direction to move the touch position onto the upper scroll instruction region 53. At that time, the scroll target image displayed in the scroll image display region 51 is not scrolled and displayed in the upward direction due to the touch position being shifted from the selection operation region 52 onto the upper scroll instruction region 53 in the upward direction (the y-axis positive direction).

As shown in FIG. 10, when the user moves the touch position onto the upper scroll instruction region 53 and keeps the touch position on the upper scroll instruction region 53 for a predetermined time (a long pressing operation), the scroll target image is scrolled and displayed in the upward direction (i.e., the scroll target image relatively moves with respect to the scroll image display region 51 in the downward direction). However, the touch position does not have to be fixed at a single point on the upper scroll instruction region 53 but suffices to be located at any position on the upper scroll instruction region 53, and the time for which the touch position is located on the upper scroll instruction region 53 is counted as a time for which a long pressing operation is performed. It is noted that the speed of scrolling is set, for example, in accordance with the time for which the touch position is located on the upper scroll instruction region 53 (the time for which a long pressing operation is performed).

The reason why the operations performed by the user for the upward scroll process and the downward scroll process are different from each other as described above is as follows. Specifically, as exemplified in the exemplary embodiment, when the image of the software keyboard has to be displayed on the lower portion of the display screen of the lower LCD 12, the scroll image display region 51 is located in the upper portion of the display screen of the lower LCD 12. In this case, the length (width), in the upward direction, of the upper scroll instruction region 53 located on the upper side of the selection operation region 52 located in the scroll image display region 51 is shorter than the length (width), in the downward direction, of the lower scroll instruction region 54 located on the lower side of the selection operation region 52. Thus, a range where a drag operation is possible in the upward direction on the upper scroll instruction region 53 is smaller than a range where a drag operation is possible in the downward direction on the lower scroll instruction region 54, and hence it is more difficult to perform a drag operation in the upward direction on the upper scroll instruction region 53 than a drag operation in the downward direction on the lower scroll instruction region 54.

Further, a maximum value of a shift amount by which a touch position on the upper scroll instruction region 53 can shift from the upper edge of the selection operation region 52 (the boundary between the selection operation region 52 and the upper scroll instruction region 53 in the upward direction (y-axis positive direction) is smaller than a maximum value of a shift amount by which a touch position on the lower scroll instruction region 54 can shift from the lower edge of the selection operation region 52 (the boundary between the selection operation region 52 and the lower scroll instruction region 54) in the downward direction (y-axis negative direction). Thus, when upward scroll display is performed in accordance with an operation that is the same as the operation for performing downward scroll display in which the speed of scrolling is set in accordance with the shift amount (see FIGS. 7 and 8), the shift amount in the upward direction can be a small value, and hence the speed of scrolling in the upward direction is lower than the speed of scrolling in the downward direction. Meanwhile, in order to make the maximum value of the speed of scrolling in the upward direction equal to the maximum value of the speed of scrolling in the downward direction by the above same operation, a rate of increase in speed with respect to a certain shift amount has to be increased. In this case, change of the speed of scrolling is rapid with respect to movement (change) of the touch position, and the operability of the user deteriorates. Due to this reason, the upward scroll process is performed in accordance with an operation (long pressing operation) different from that for the downward scroll process.

[Second Upward Scroll Process]

Figure 11:
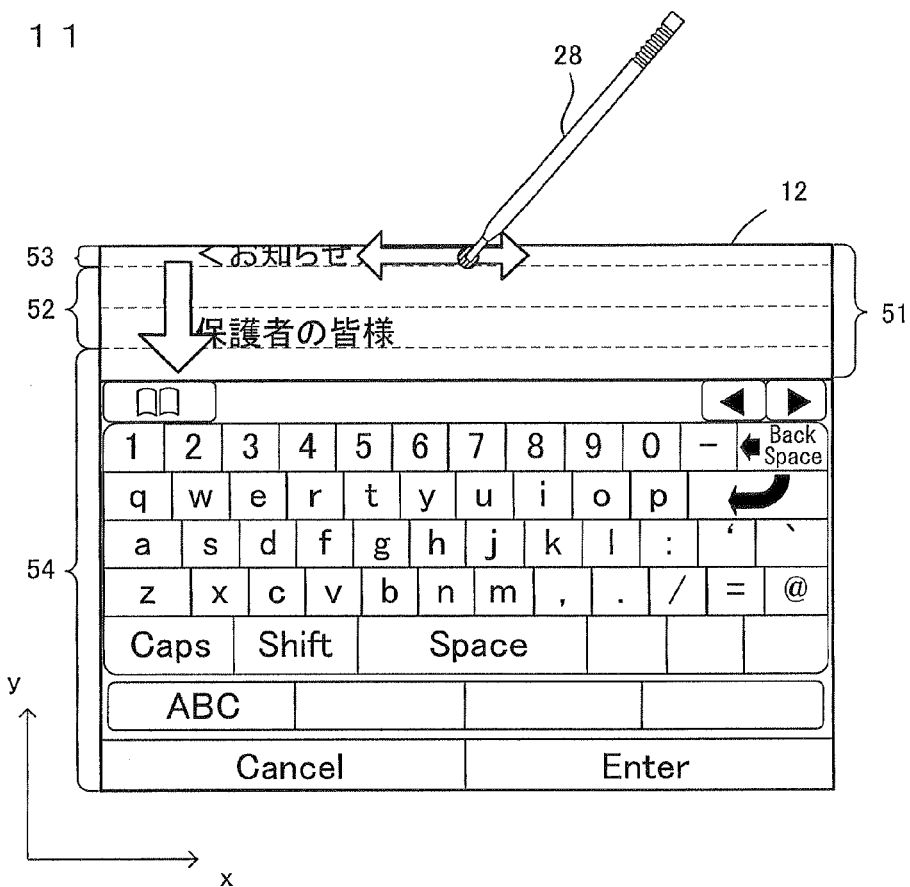
FIG. 11 is a diagram illustrating a non-limiting example of an operation performed by the user on the display screen of the lower LCD 12.

FIG. 11 illustrates a situation where the user drags the touch pen 28 in the right-left direction to scroll and display the scroll target image in the upward direction. The user initially performs a touch-on on the selection operation region 52 by using the touch pen 28, and then drags the touch pen 28 in the upward direction to move the touch position onto the upper scroll instruction region 53 (see FIG. 9). Then, the user drags the touch pen 28 on the upper scroll instruction region 53 in the right-left direction (see FIG. 11). At that time, as shown in FIG. 11, the scroll target image displayed in the scroll image display region 51 is scrolled and displayed in the upward direction. It is noted that the speed of scrolling is set, for example, in accordance with the operation amount (distance) and speed of the drag operation.

The reason why the second upward scroll process is performed as described above is as follows. As described above, the first upward scroll process is performed when the user initially performs a touch-on on the selection operation region 52, moves the touch position onto the upper scroll instruction region 53, and then keeps the touch position on the upper scroll instruction region 53 for a predetermined time (a long pressing operation). Thus, when the user desires to immediately perform upward scroll display, waiting for elapse of the predetermined time is against the user's intention, and hence the user may feel discomfort. In addition, since a time of a long pressing operation has to be long (i.e., the user has to wait) in order for the user to increase the speed of scroll display, an operation that contradicts the user's intention to quickly (fast) perform scroll display has to be performed, and this may increase user's discomfort.

However, according to the second upward scroll process, upward scroll display can be performed in accordance with a drag operation being performed in the right-left direction on a region, in the upper scroll instruction region 53, which extends in the right-left direction and in which a range where a drag operation is possible is wider in the right-left direction than in the up-down direction. Thus, the user can change the speed of scroll display in the upward direction by a drag operation in the right-left direction, and can cause upward scroll display to be performed without waiting for elapse of the predetermined time. As a result, upward scroll display can be performed when the user performs a long pressing operation on the upper scroll instruction region 53 or performs a drag operation on the upper scroll instruction region 53 in the right-left direction by using the touch pen 28, and the operability for scroll display improves.

Further, the reason why the second upward scroll process is performed is also as follows. As exemplified in the exemplary embodiment, when the scroll image display region 51 is located at the upper edge of the display screen of the lower LCD 12, the upper scroll instruction region 53 has to be provided in the scroll image display region 51. Thus, the length (width) of the upper scroll instruction region 53 in the upward direction (scrolling direction) is short. However, the length (width) of the upper scroll instruction region 53 in the right-left direction can be lengthened even in the scroll image display region 51 as compared to the length thereof in the up-down direction. Therefore, the scroll target image can be scrolled and displayed in the upward direction in accordance with a drag operation being performed in the right-left direction on the upper scroll instruction region 53 for which a limited region in the scroll image display region 51 is used and which is long in the right-left direction.

In other words, according to the second upward scroll process, even when the proportion of the scroll image display region 51 in the lower LCD 12 cannot be increased such that the area in which the upper scroll instruction region 53 is located has a sufficient length in the scrolling direction (up-down direction), upward scroll display can be performed in accordance with a drag operation being performed on a region extending in a direction (the right-left direction) different from the scrolling direction. Due to this, even when the size of the scroll image display region 51 is increased in the lower LCD 12, the scroll target image displayed in the scroll image display region 51 can appropriately be scrolled and displayed with good operability.

[Second Downward Scroll Process]

Figure 12:
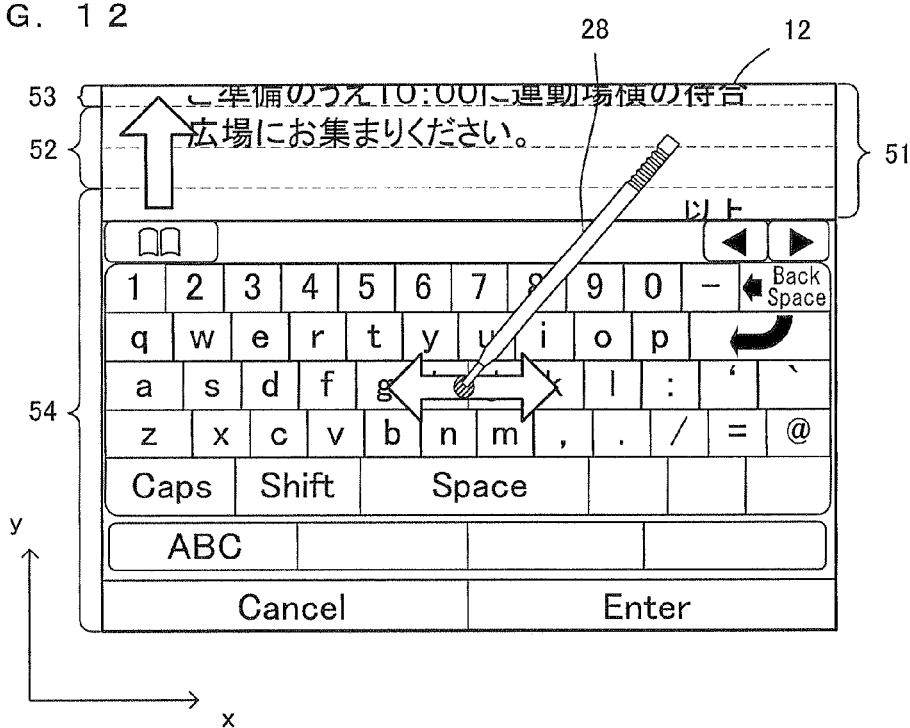
FIG. 12 is a diagram illustrating a non-limiting example of an operation performed by the user on the display screen of the lower LCD 12.

FIG. 12 illustrates a situation where the user drags the touch pen 28 in the right-left direction to scroll and display the scroll target image in the downward direction. The user initially performs a touch-on on the selection operation region 52 by using the touch pen 28, and then drags the touch pen 28 in the downward direction to move the touch position onto the lower scroll instruction region 54 (see FIG. 7). At that time, as shown in FIG. 8, the scroll target image is scrolled and displayed in the downward direction at a speed corresponding to the operation amount (distance) of the drag operation in the downward direction. Further, the user drags the touch pen 28 on the lower scroll instruction region 54 in the right-left direction (see FIG. 12). At that time, as shown in FIG. 12, the scroll target image is scrolled and displayed in the downward direction at a higher speed. It is noted that the amount of increase in the speed of scrolling is set, for example, in accordance with the operation amount (distance) and speed of the drag operation in the right-left direction shown in FIG. 12.

The reason why the second downward scroll process is performed as described above is as follows. As described above, the first downward scroll process (see FIG. 8) is performed when the user initially performs a touch-on on the selection operation region 52 and moves the touch position onto the lower scroll instruction region 54, and the speed of scroll display is set in accordance with the shift amount of the touch position in the downward direction. However, the maximum value of the shift amount in the downward direction is the amount of shift to the lower edge of the lower scroll instruction region 54, and thus the speed of scroll display that is set in accordance with the shift amount has a limit. However, depending on the user or the size (the length in the up-down direction) of the scroll target image, it is desired to perform scroll display at a higher speed.

In such a case, when, in addition to the normal first downward scroll process (see FIG. 8), the second downward scroll process (see FIG. 12) is performed, the user can cause the scroll target image to be scrolled and displayed in the downward direction at a higher speed. Therefore, the user who desires to perform scroll display in the downward direction at a high speed performs a normal drag operation in the downward direction as well as a drag operation in the right-left direction, whereby scroll display can be performed in the downward direction at an intended speed.

As described above, when the user initially performs a touch-on on the selection operation region 52, selection display of selecting a part or the entirety of the scroll target image displayed in the scroll image display region 51, upward scroll display of the scroll target image, and downward scroll display of the scroll target image can be performed. In addition, upward scroll display of the scroll target image can be performed in accordance with a long pressing operation with the touch pen 28 and a drag operation with the touch pen 28 in the right-left direction. Downward scroll display of the scroll target image can be performed in accordance with a drag operation with the touch pen 28 in the downward direction (into the lower scroll instruction region 54) and a drag operation with the touch pen 28 in the right-left direction. Therefore, the flexibility in the operation for scroll display is increased for the user, and the operation for scroll display in the upward direction is possible regardless of the position and the size of the upper scroll instruction region 53 constrained by the position and the size of the scroll image display region 51 within the lower LCD 12.

[Memory Map]

Figure 13:
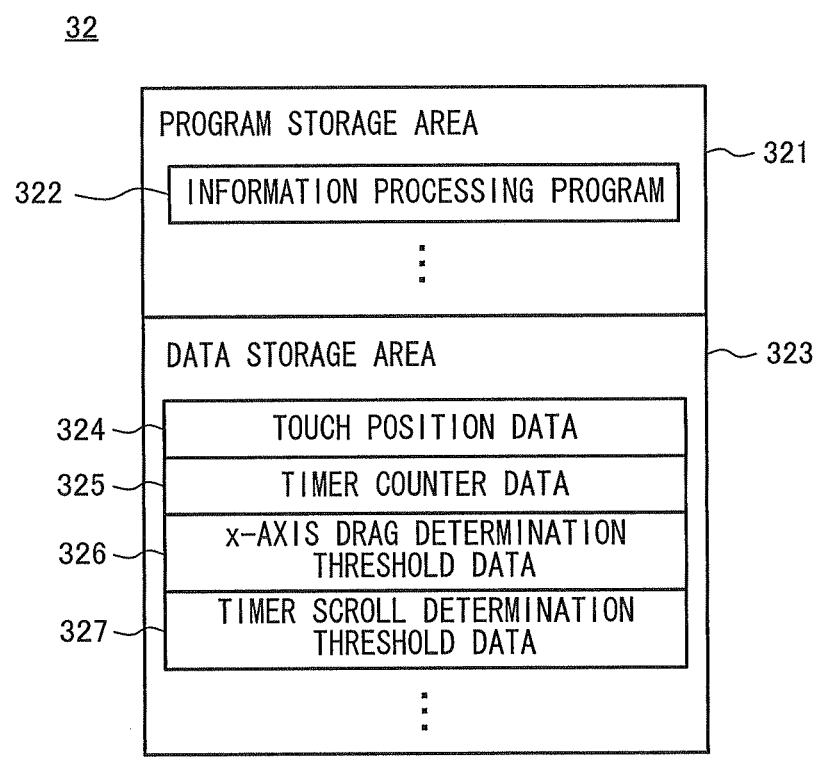
FIG. 13 is a non-limiting example of a memory map of a main memory 32.

Hereinafter, data that is stored in the main memory 32 when information processing is performed will be described with reference to FIG. 13. FIG. 13 is a memory map of the main memory 32. As exemplified in FIG. 13, the main memory 32 includes a program storage area 321 and a data storage area 323. In the program storage area 321, programs executed by the CPU 311 are stored. In the data storage area 323, various data used for the information processing is stored. The programs in the program storage area 321 and a part of data in the data storage area 323 are data which is previously stored in the external memory 45 or the like and is read out from the external memory 45 or the like when the information processing is performed.

In the program storage area 321, an information processing program 322 and the like are stored. The information processing program 322 is a program for causing the CPU 311 to perform a series of processes shown in FIGS. 14 to 16.

In the data storage area 323, touch position data 324, timer counter data 325, x-axis drag determination threshold data 326, timer scroll determination threshold data 327, and the like are stored.

The touch position data 324 indicates a touch position on the display screen of the lower LCD 12 by the touch pen 28. In the exemplary embodiment, the touch position is represented by a two-dimensional coordinate (x, y) for which the longitudinal direction of the screen of the lower LCD 12 shown in FIG. 5 is defined as an x-axis direction and a direction perpendicular to the x-axis direction is defined as a y-axis direction. When a touch-on is performed on the display screen of the lower LCD 12, touch position data (A(1), A(2), ..., A(n)) including initial touch position data A(1) to latest nth touch position data A(n) is continuously stored as the touch position data 324 in the data storage area 323 every predetermined time.

In other words, while user continuously performs a touch-on on the display screen of the lower LCD 12, a track of the touch position is stored as the touch position data 324 in the data storage area 323. On the basis of the latest touch position data A(n) indicated by the touch position data 324, for example, a process of determining whether or not a touch-on is performed on the selection operation region 52 with the touch pen 28, or the like, is performed. It is noted that when a touch-off is performed, all the touch position data 324 is reset (initialized).

The timer counter data 325 indicates a time of which measurement is started when a touch-on is initially performed on the selection operation region 52 with the touch pen 28 and the touch position moves from the selection operation region 52 onto the upper scroll instruction region 53. Then, the time is stored as the timer counter data 325 in the data storage area 323 while the touch position is located on the upper scroll instruction region 53. It is noted that the timer counter data 325 is reset (initialized) when the touch position is located out of the upper scroll instruction region 53.

The x-axis drag determination threshold data 326 is data of a threshold used for determining whether or not a drag operation of the user with the touch pen 28 in the right-left direction can be regarded as an instruction to scroll and display a scroll target image. Specifically, the x-axis drag determination threshold data 326 is data of a threshold for determining whether or not a shift of a touch position in the upper scroll instruction region 53 or the lower scroll instruction region 54 after a touch-on is initially performed on the selection operation region 52 with the touch pen 28 and then the touch position moves from the selection operation region 52 onto the upper scroll instruction region 53 or the lower scroll instruction region 54 can be regarded as an instruction to scroll and display a scroll target image. This data is intended to exclude a shift caused by unintentional hand movement of the user, and an arbitrary value is set to this data. For example, when a shift caused by unintentional hand movement of the user does not have to be taken into consideration, the value suffices to be set to 0 (zero).

Further, when the speed of scrolling is changed in accordance with a shift amount of a touch position in the right-left direction, the x-axis drag determination threshold data 326 is also used as a threshold for selecting a speed of scrolling. For example, when: data X0 of the x-axis drag determination threshold data 326 is used as a determination value based on which it is regarded as an instruction for scroll display; and data X1 thereof is used as a threshold for a speed Va of scrolling, a speed V of scrolling is set to Va if the value of a shift amount of a touch position in the right-left direction is equal to or greater than X0 but less than X1, and the speed V of scrolling is set to Vb (an upper limit) if the value of the shift amount is equal to or greater than X1. When a speed of scrolling is set to a speed corresponding to a shift amount of a touch position in the right-left direction as described above, a plurality of thresholds corresponding to speeds, respectively, can also be stored as the x-axis drag determination threshold data 326 in the data storage area 323. In this case, the speeds Va and Vb of scrolling and the like are stored as speed data (not shown) in the data storage area 323.

The timer scroll determination threshold data 327 is data of a threshold used for determining whether or not the time of which measurement is started and which is indicated by the timer counter data 325 exceeds a predetermined time. Specifically, the timer scroll determination threshold data 327 is data of a threshold for determining whether or not it can be regarded as an instruction to scroll and display a scroll target image, on the basis of a time for which a touch position is located on the upper scroll instruction region 53 after a touch-on is initially performed on the selection operation region 52 with the touch pen 28 and then the touch position moves from the selection operation region 52 onto the upper scroll instruction region 53.

Further, when a speed of scrolling is changed in accordance with a time for which a touch position is located on the upper scroll instruction region 53, the timer scroll determination threshold data 327 is also used as a threshold for selecting a speed of scrolling. For example, when: data T0 of the timer scroll determination threshold data 327 is used as a determination value based on which it is regarded as an instruction for scroll display; and data T1 thereof is used as a threshold for a speed Va of scrolling, a speed V of scrolling is set to Va if a value T of the timer counter data 325 is equal to or greater than T0 but less than T1, and the speed V of scrolling is set to Vb (an upper limit) if the value T of the timer counter data 325 is equal to or greater than T1. When a speed of scrolling is set to a speed corresponding to a time of a long pressing operation as described above, a plurality of thresholds corresponding to speeds, respectively, can also be stored as the timer scroll determination threshold data 327 in the data storage area 323.

[Processes Performed by CPU 311]

Next, a selection process and a scroll process performed by the CPU 311 will be described with reference to flowcharts of FIGS. 14 to 16. It is noted that a series of processes described below is performed by the CPU 311 or in accordance with instructions issued by the CPU 311, on the basis of the information processing program 322 stored in the main memory 32. In addition, in these flowcharts, processes regarding generation and output of an image are omitted, but generation and output of an image is performed in constant cycles.

Figure 14:
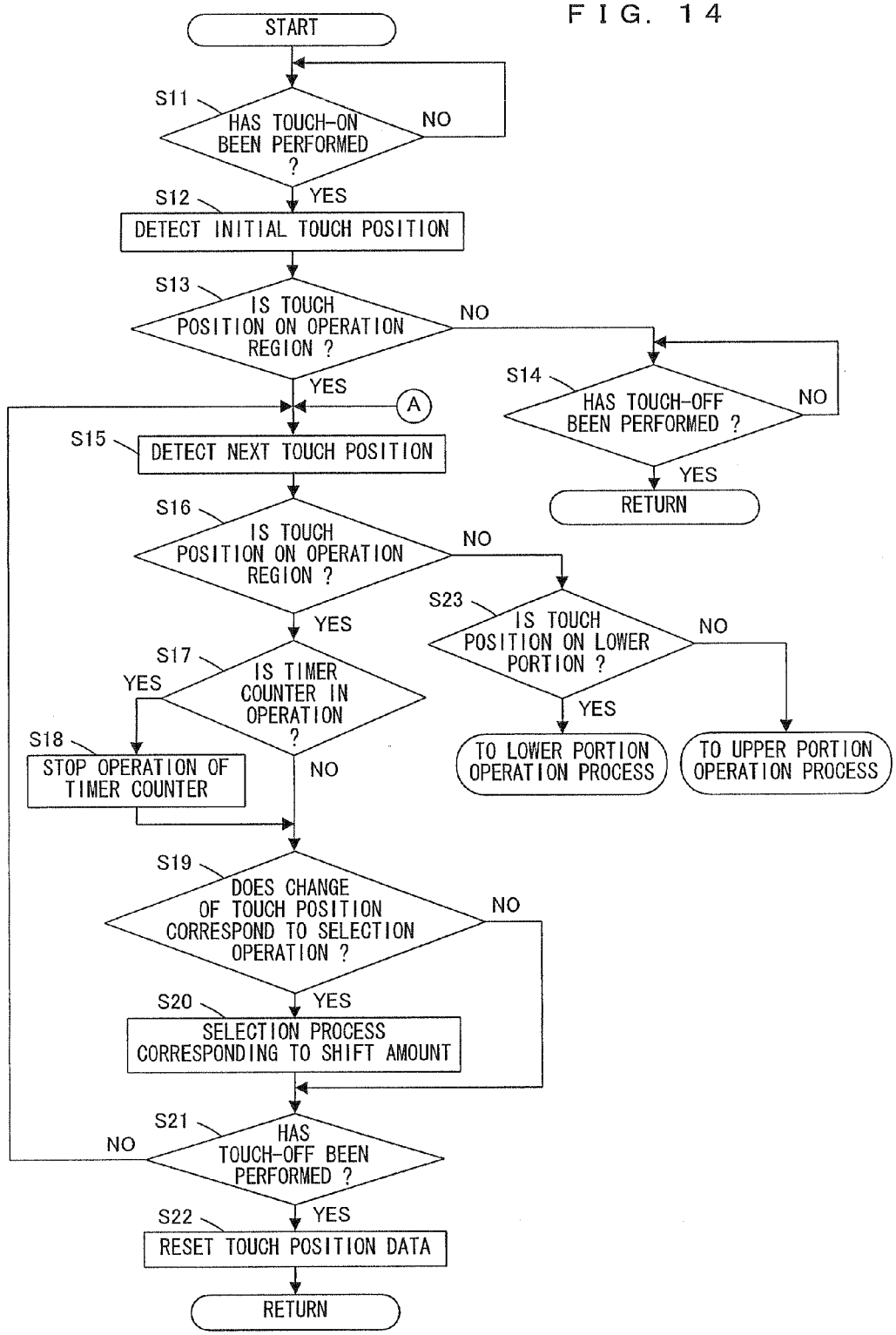
FIG. 14 is a flowchart illustrating a non-limiting example of processing executed by a CPU 311.

As shown in FIG. 14, first, at step S11, the CPU 311 determines whether or not a touch-on has been performed on the display screen of the lower LCD 12. When a result of the determination at step S11 is YES, the processing proceeds to step S12, and when the result of the determination is NO, the processing returns to step S11. In other words, when a touch-on has not been performed on the display screen of the lower LCD 12, the CPU 311 repeats the determination at step S11 until it is determined that a touch-on has been performed.

At step S12, the CPU 311 detects the initial touch position at which the touch-on is determined at step S11 to have been performed on the display screen of the lower LCD 12. Specifically, the CPU 311 detects the touch position on the basis of the initial touch position data A(1) of the touch position data 324 stored in the data storage area 323. Then, the processing proceeds to step S13.

At step S13, the CPU 311 determines whether or not the initial touch position detected at step S12 is on the selection operation region 52. When a result of the determination at step S13 is YES, the processing proceeds to step S15, and when the result of the determination is NO, the processing proceeds to step S14.

At step S14, the CPU 311 determines whether or not a touch-off has been performed on the display screen of the lower LCD 12 with the touch pen 28. When a result of the determination at step S14 is YES, the processing returns to step S11, and when the result of the determination is NO, the processing returns to step S14. In other words, the CPU 311 repeats the determination at step S14 until it is determined that a touch-off has been performed, and the processing returns to step S11 when it is determined that a touch-off has been performed.

In other words, when the initial touch position is detected (step S12) and this touch position is not on the selection operation region 52 (step S13: NO), the selection process and the scroll process are not performed even if the touch-on is continuously performed on the display screen of the lower LCD 12 later. Thus, the CPU 311 waits for a touch-off being performed on the display screen of the lower LCD 12 with the touch pen 28.

At step S15, the CPU 311 detects the next touch position. Specifically, the CPU 311 detects the next touch position on the basis of the latest touch position data A(n) of the touch position data 324 stored in the data storage area 323. Then, the processing proceeds to step S16.

At step S16, the CPU 311 determines whether or not the next touch position detected at step S15 is on the selection operation region 52. When a result of the determination at step S16 is YES, the processing proceeds to step S17, and when the result of the determination is NO, the processing proceeds to step S23.

In other words, when the initial touch position is on the selection operation region 52 (step S13: YES), it is determined whether the selection process is to be performed, the scroll process is to be performed, or neither the selection process nor the scroll process is to be performed, on the basis of where the touch position moves later (on the basis of where the next touch position is detected). Thus, at step S16, it is determined which region the next touch position is located in the display screen of the lower LCD 12.

At step S17, the CPU 311 determines whether or not a timer counter is in operation, on the basis of the timer counter data 325 stored in the data storage area 323. When a result of the determination at step S17 is YES, the processing proceeds to step S18, and when the result of the determination is NO, the processing proceeds to step S19.

At step S18, the CPU 311 stops the operation of the timer counter. Specifically, the CPU 311 stops measurement of the timer counter which is conducting the measurement, and resets (initializes) the timer counter data 325.

The reason why the operation of the timer counter is stopped (step S18) when the timer counter is in operation (step S17: YES) as described above is as follows. Specifically, the timer counter operates when a touch position is located on the upper scroll instruction region 53 in an upper portion operation process (see FIG. 16) described later, and the timer counter measures a time for which the touch position is continuously located on the upper scroll instruction region 53. Thus, when the touch position moves onto the selection operation region 52 (when the touch position is detected on the selection operation region 52), the measured time is reset and the operation of the timer counter stops.

At step S19, the CPU 311 determines whether or not a shift of the touch position corresponds to a selection operation. Specifically, the CPU 311 calculates a shift of the touch position from the latest touch position data A(n) and immediately previous touch position data A (n−1) of the touch position data 324 stored in the data storage area 323, and determines whether or not the shift is a shift corresponding to a selection operation. When a result of the determination at step S19 is YES, the processing proceeds to step S20, and when the result of the determination is NO, the processing proceeds to step S21.

At step S20, on the basis of the shift of the touch position calculated at step S19, the CPU 311 performs a selection process corresponding to the shift amount. Specifically, the CPU 311 selects a part (or the entirety) of an image corresponding to a region corresponding to the shift amount, from a scroll target image displayed in the scroll image display region 51, and highlights the selected image (see FIG. 6). Then, the processing proceeds to step S21.

At step S21, the CPU 311 determines whether or not a touch-off has been performed on the display screen of the lower LCD 12 with the touch pen 28. When a result of the determination at step S21 is YES, the processing proceeds to step S22, and when the result of the determination is NO, the processing returns to step S15. In other words, as long as the touch-on is performed on the display screen of the lower LCD 12, the latest touch position is continuously detected.

At step S22, the CPU 311 resets the touch position data 324. In other words, when a touch-off has been performed on the display screen of the lower LCD 12 with the touch pen 28 (step S21: YES), the touch position data 324 is reset (initialized). Then, the processing returns to step S11.

At step S23, the CPU 311 determines whether or not the touch position is on the lower scroll instruction region 54. When a result of the determination at step S23 is YES, the processing proceeds to a lower portion operation process (see FIG. 15). When the result of the determination is NO (i.e., when the touch position is on the upper scroll instruction region 53), the processing proceeds to the upper portion operation process (see FIG. 16).

Next, the lower portion operation process performed by the CPU 311 will be described with reference to FIG. 15.

First, at step S31, the CPU 311 calculates a first speed V1 of scrolling in the downward direction on the basis of the y coordinate of the touch position that is detected at step S15 (see FIG. 14) and is determined at step S23 (see FIG. 14) to be located on the lower scroll instruction region 54 (step S23: YES). Specifically, the CPU 311 calculates a shift amount by which the touch position has shifted from the lower edge of the selection operation region 52 (the boundary between the selection operation region 52 and the lower scroll instruction region 54) in the y-axis negative direction (downward direction), on the basis of the y coordinate of the latest touch position data A(n) of the touch position data 324 stored in the data storage area 323. Then, the CPU 311 calculates the first speed V1 on the basis of the shift amount. For example, settings may be made such that the speed V1 increases in proportion to the shift amount, or a certain speed may be caused to correspond to each range of the shift amount. Then, the processing proceeds to step S32.

At step S32, the CPU 311 determines whether or not a shift of the touch position in the x-axis direction exceeds a predetermined threshold. Specifically, the CPU 311 calculates a shift amount of the touch position in the x-axis direction from the x coordinate of the latest touch position data A(n) and the x coordinate of the immediately previous touch position data A(n−1) of the touch position data 324 stored in the data storage area 323, and determines whether or not the shift amount exceeds the value of the x-axis drag determination threshold data 326 stored in the data storage area 323. When a result of the determination at step S32 is YES, the processing proceeds to step S33, and when the result of the determination is NO, the processing proceeds to step S34.

At step S33, the CPU 311 calculates a second speed V2 of scrolling in the downward direction on the basis of the shift amount of the touch position in the x-axis direction that is determined at step S32 to exceed the threshold (step S32: YES). For example, settings may be made such the speed V2 increases in proportion to the shift amount, or a certain speed may be caused to correspond to each range of the shift amount. Then, the processing proceeds to step S35.

At step S34, the CPU 311 sets a value 0 as the second speed V2 of scrolling in the downward direction, since it is determined at step S32 that the shift amount of the touch position in the x-axis direction does not exceed the threshold (step S32: NO). Then, the processing proceeds to step S35.

At step S35, the CPU 311 adds the first speed V1 calculated at step S31 and the second speed V2 calculated at step S33 or S34, to calculate a speed V of scrolling in the downward direction. Then, the processing proceeds to step S36.

At step S36, the CPU 311 scrolls and displays the scroll target image displayed in the scroll image display region 51, in the downward direction at the speed V calculated at step S36. Then, the processing proceeds to step S37.

At step S37, the CPU 311 determines whether or not a touch-off has been performed on the display screen of the lower LCD 12 with the touch pen 28. When a result of the determination at step S37 is YES, the processing proceeds to step S38, and when the result of the determination is NO, the processing returns to step S15 (see FIG. 14). In other words, as long as the touch-on is performed on the display screen of the lower LCD 12, the latest touch position is continuously detected.

At step S38, the CPU 311 resets the touch position data 324. In other words, when a touch-off has been performed on the display screen of the lower LCD 12 with the touch pen 28 (step S37: YES), the touch position data 324 is reset (initialized). Then, the processing returns to step S11 in FIG. 14.

As described above, in the lower portion operation process, the first speed V1 is set in accordance with the position of the touch position in the up-down direction (y-axis direction), the second speed V2 is set in accordance with the shift amount of the touch position in the right-left direction (x-axis direction), and the sum (V1+V2) of these speeds is set as the speed V of scrolling in the downward direction.

Next, the upper portion operation process performed by the CPU 311 will be described with reference to FIG. 16.

First, at step S51, the CPU 311 determines whether or not the timer counter is in operation, on the basis of the timer counter data 325 stored in the data storage area 323. When a result of the determination at step S51 is YES, the processing proceeds to step S53, and when the result of the determination is NO, the processing proceeds to step S52.

At step S52, the CPU 311 starts an operation of the timer counter. Specifically, the CPU 311 starts measurement of the timer counter, and stores the measured time as the timer counter data 325 in the data storage area 323. Then, the processing proceeds to step S55.

At step S53, the CPU 311 determines whether or not a value T of the timer counter exceeds a predetermined threshold. Specifically, the CPU 311 determines whether or not the timer counter data 325 stored in the data storage area 323 exceeds the value of the timer scroll determination threshold data 327 stored in the data storage area 323. When a result of the determination at step S53 is YES, the processing proceeds to step S54, and when the result of the determination is NO, the processing proceeds to step S55.

At step S54, the CPU 311 calculates a first speed V1 of scrolling in the upward direction on the basis of the value T of the timer counter that is determined at step S53 to exceed the threshold (step S53: YES). For example, settings may be made such that the speed V1 increases in proportion to the magnitude of the value T, or a certain speed may be caused to correspond to each range of the value T. Then, the processing proceeds to step S56.

At step S55, the CPU 311 sets a value 0 as the first speed V1 of scrolling in the upward direction, since it is immediately after the operation of the timer counter is started (step S52) or since the value T of the timer counter does not exceed the predetermined threshold (step S53: NO). Then, the processing proceeds to step S56.

At step S56, the CPU 311 determines whether or not a shift of the touch position in the x-axis direction exceeds a predetermined threshold. Specifically, the CPU 311 calculates a shift amount of the touch position in the x-axis direction from the x coordinate of the latest touch position data A(n) and the x coordinate of the immediately previous touch position data A (n−1) of the touch position data 324 stored in the data storage area 323, and determines whether or not the shift amount exceeds the value of the x-axis drag determination threshold data 326 stored in the data storage area 323. When a result of the determination at step S56 is YES, the processing proceeds to step S57, and when the result of the determination is NO, the processing proceeds to step S58.

At step S57, the CPU 311 calculates a second speed V2 of scrolling in the upward direction on the basis of the shift amount of the touch position in the x-axis direction that is determined at step S56 to exceed the threshold (step S56: YES). For example, settings may be made such that the speed V2 increases in proportion to the shift amount, or a certain speed may be caused to correspond to each range of the shift amount. Then, the processing proceeds to step S59.

At step S58, the CPU 311 sets a value 0 as the second speed V2 of scrolling in the upward direction, since it is determined at step S56 that the shift amount of the touch position in the x-axis direction does not exceed the threshold (step S56: NO).

At step S59, the CPU 311 adds the first speed V1 calculated at step S54 or S55 and the second speed V2 calculated at step S57 or S58, to calculate a speed V of scrolling in the upward direction. Then, the processing proceeds to step S60.

At step S60, the CPU 311 scrolls and displays the scroll target image displayed in the scroll image display region 51, in the upward direction at the speed V calculated at step S59. Then, the processing proceeds to step S61.

At step S61, the CPU 311 determines whether or not a touch-off has been performed on the display screen of the lower LCD 12 with the touch pen 28. When a result of the determination at step S61 is YES, the processing proceeds to step S62, and when the result of the determination is NO, the processing returns to step S15 (see FIG. 14). In other words, as long as the touch-on is performed on the display screen of the lower LCD 12, the latest touch position is continuously detected.

At step S62, the CPU 311 stops the operation of the timer counter. Specifically, the CPU 311 stops the measurement of the timer counter which is conducting the measurement, and rests (initializes) the timer counter data 325.

At step S63, the CPU 311 resets the touch position data 324. In other words, when a touch-off has been performed on the display screen of the lower LCD 12 (step S61: YES), the touch position data 324 is reset (initialized). Then, the processing returns to step S11 in FIG. 14.

As described above, in the upper portion operation process, the first speed V1 is set in accordance with the time for which the touch position exists (the time for which a long pressing operation is performed), the second speed V2 is set in accordance with the shift amount of the touch position in the right-left direction (x-axis direction), and the sum (V1+V2) of these speeds is set as the speed V of scrolling in the upward direction.

As described above, the CPU 311 determines whether or not a position at which a touch-on is initially performed is on the selection operation region 52 (steps S11 to S13), and when the position is on the selection operation region 52, the CPU 311 determines the subsequent touch position (steps S16 and S23), and performs the selection process (steps S17 to S22), the lower portion operation process (steps S31 to S38), and the upper portion operation process (steps S51 to S63) in accordance with the result of the determination.

When it is determined that the next touch position (latest touch position) is on the selection operation region 52 (step S16: YES), the selection process is performed in which a part (or the entirety) of the scroll target image is selected in accordance with the shift amount of the touch position (steps S19 and S20). In the exemplary embodiments disclosed herein, the selection process is not a principal part, and thus the detailed description thereof is omitted. Normally, after the selection process, a predetermined program is activated for the selected scroll target image.

When it is determined that the next touch position (latest touch position) is on the lower scroll instruction region 54 (step S23: YES), scroll display is performed in the downward direction (steps S31 to S36). The speed of scrolling in this scroll display is the sum of: the first speed V1 that is set in accordance with the position of the touch position in the up-down direction (y-axis direction) (step S31); and the second speed V2 that is set in accordance with the shift amount of the touch position in the right-left direction (x-axis direction) (steps S33 and S34). Therefore, the user can cause scroll display to be performed at the speed V1 only by moving the touch pen 28 in the downward direction to shift the touch position onto the lower scroll instruction region 54. In addition, when performing scroll display at a higher speed, the user can cause scroll display to be performed at the speed V1+V2 only by moving (dragging) the touch pen 28 on the lower scroll instruction region 54 in the right-left direction.

When it is determined that the next touch position (latest touch position) is on the upper scroll instruction region 53 (step S23: NO), scroll display is performed in the upward direction (steps S51 to S60). The speed of scrolling in this scroll display is the sum of: the first speed V1 that is set in accordance with the time for which the touch position is located on the upper scroll instruction region 53 (steps S54 and S55); and the second speed V2 that is set in accordance with the shift amount of the touch position in the right-left direction (x-axis direction) (steps S57 and S58). Therefore, display scroll can be performed at the speed V1 when the user moves the touch pen 28 in the upward direction to locate the touch position on the upper scroll instruction region 53 and waits for elapse of the predetermined time. In addition, when performing scroll display at a higher speed, the user can cause scroll display to be performed at the speed V1+V2 by moving the touch pen 28 on the upper scroll instruction region 53 in the right-left direction. Moreover, when the user does not desire to wait for elapse of the predetermined time, the user can cause scroll display to be performed at the speed V2 by immediately moving the touch pen 28 on the upper scroll instruction region 53 in the right-left direction. It is noted that in this case, scroll display is performed at the speed V2+V1 when the touch pen 28 is continuously moved in the right-left direction for a predetermined time.

[Modifications]

In the embodiment described above, when the touch position moves on the upper scroll instruction region 53 in the right-left direction (x-axis direction) after a touch-on is initially performed on the selection operation region 52 and the touch position moves from the selection operation region 52 onto the upper scroll instruction region 53, scroll display is performed in the upward direction (y-axis positive direction). However, when a touch-on is initially performed on the upper scroll instruction region 53 and the touch position moves on the upper scroll instruction region 53 in the right-left direction, scroll display may be performed in the upward direction.

Further, in the embodiment described above, in the upward scroll process, the speed of scrolling is set to the sum of the first speed V1 and the second speed V2. However, the speed of scrolling may be set to only the second speed V2. In other words, scroll display may be performed when the touch pen 28 is moved on the upper scroll instruction region 53 in the right-left direction. In this case as well, the user can cause scroll display to immediately be performed at a desired speed in the upward direction, by adjusting the shift amount of the touch pen 28 in the right-left direction.

Further, in the embodiment described above, as an example, the case has been described where the scroll image display region 51 extends to the upper edge of the display screen of the lower LCD 12 and thus the length of the upper scroll instruction region 53 in the scrolling direction (upward direction) is short. However, the scroll image display region 51 may extend also in the lower portion of the display screen of the lower LCD 12, and thus the length of the lower scroll instruction region 54 in the scrolling direction (downward direction) may be shortened. In this case, the speed V1 may not be calculated from the magnitude of the shift amount by which the touch position has shifted from the lower edge of the selection operation region 52 (the boundary between the selection operation region 52 and the lower scroll instruction region 54) in the y-axis negative direction (downward direction), and only the second speed V2 of scrolling in the downward direction may be calculated on the basis of the shift amount of the touch position in the x-axis direction (right-left direction).

Further, in the embodiment described above, as in a case where the scroll image display region 51 occupies the entirety (or substantially the entirety) of the display screen of the lower LCD 12, both the length of the upper scroll instruction region 53 in the scrolling direction (upward direction) and the length of the lower scroll instruction region 54 in the scrolling direction (downward direction) may be short. In such a case as well, the speed of scrolling in the upward direction and the speed of scrolling in the downward direction are calculated on the basis of the shift amount of the touch position in the right-left direction. Therefore, even in the case where the scroll image display region 51 occupies the entirety (or substantially the entirety) of the display screen of the lower LCD 12, scroll display can be performed in the up-down direction.

Figure 15:
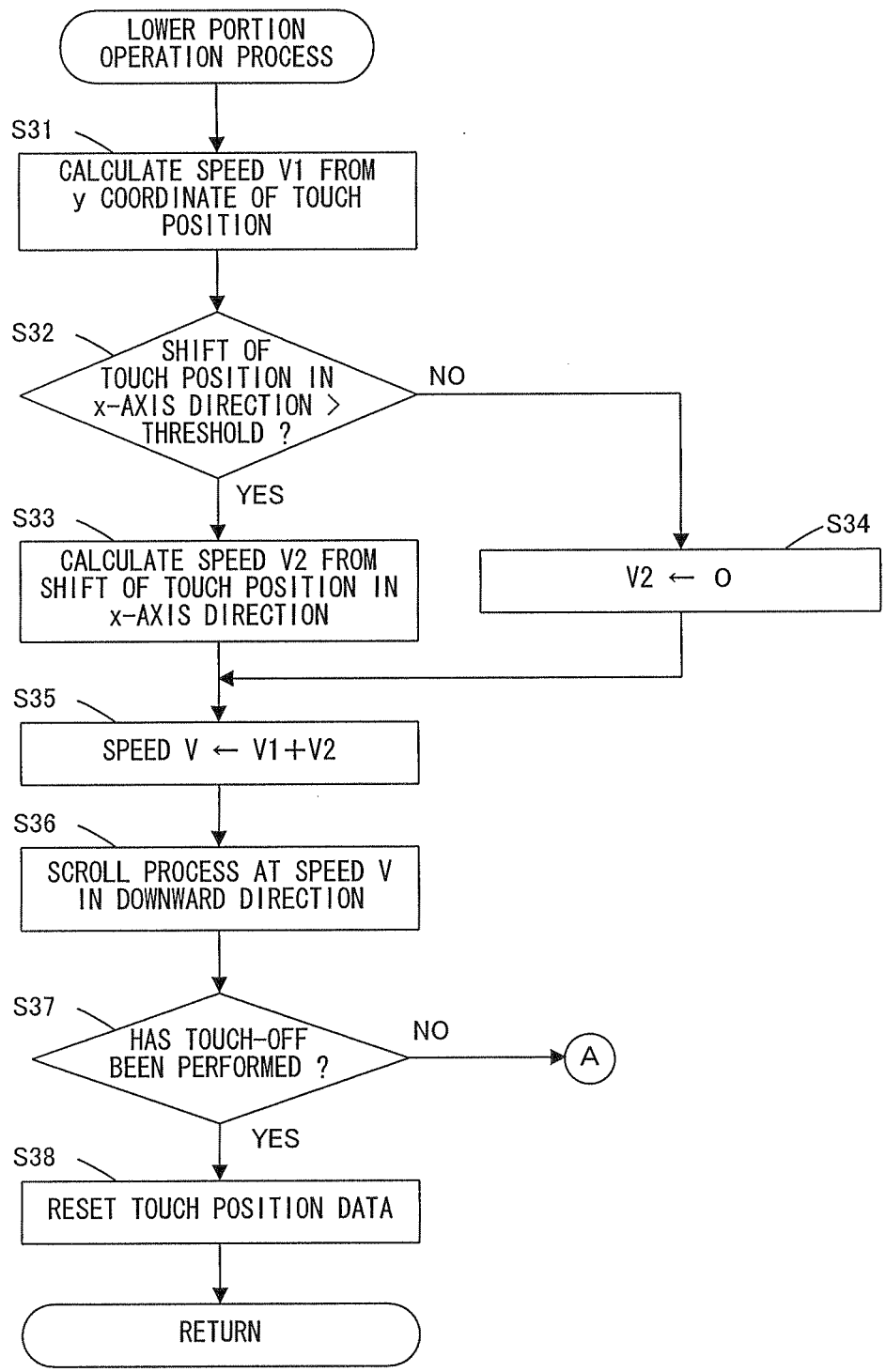
FIG. 15 is a flowchart illustrating a non-limiting example of processing executed by the CPU 311.
Figure 16:
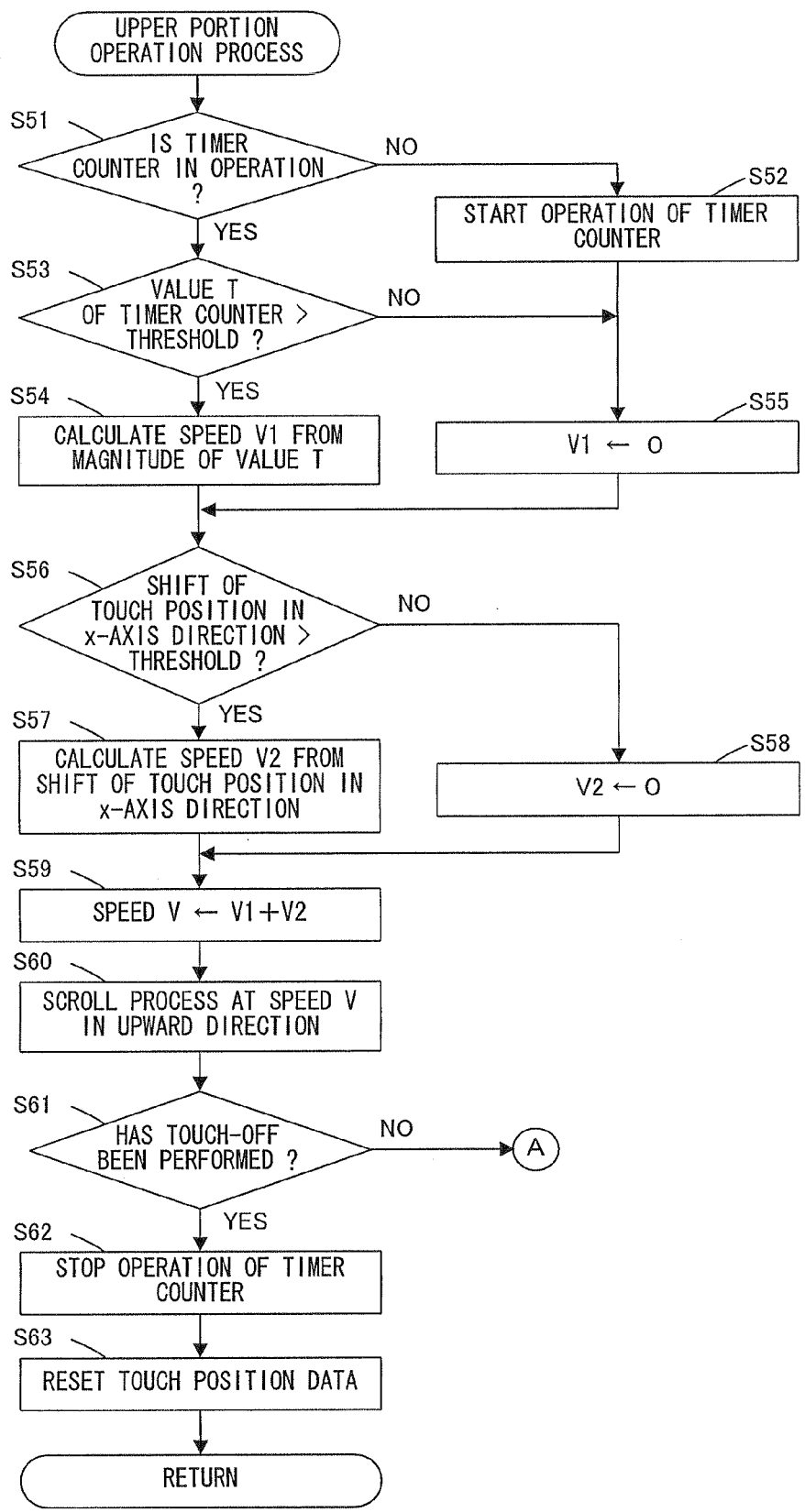
FIG. 16 is a flowchart illustrating a non-limiting example of processing executed by the CPU 311.

Further, in the embodiment described above, the shift amount of the touch position in the right-left direction (x-axis direction) is based on the shift amount in x coordinate between the latest touch position data A(n) and the immediately previous touch position data A(n−1) (see step S33 in FIG. 15 and step S57 in FIG. 16). In other words, in the embodiment described above, a base time for the shift amount in the right-left direction is the same as the interval of detecting the touch position, and the second speed V2 is calculated on the basis of the shift amount (i.e., the shift speed) in the x-axis direction per base time. However, the base time may not be the same as the interval of detecting the touch position, and for example, may be a time for which five touch positions are detected. In this case, the shift amount in x coordinate between the latest touch position data A(n) and touch position data A(n−5) that is previous to the latest touch position data A(n) by five items is used as a shift amount for calculating the second speed V2.

Further, in the embodiment described above, the second speed V2 is calculated on the basis of the shift amount (shift speed) in the x-axis direction per base time (the interval of detecting the touch position) as described above. However, for example, the average of three consecutive shift amounts may be used as a shift amount for calculating the second speed V2. Specifically, when consecutive four items of touch position data are represented by A(n−3), A(n−2), A(n−1), and A(n), the shift amounts in x coordinate between each position data, X1=A(n−2)−A(n−3), X2=A(n−1)−A(n−2), and X3=A(n)−A(n−1), are calculated, and the average of the shift amounts X1, X2, and X3 in x coordinate is used as a shift amount for calculating the second speed V2.

Further, in the embodiment described above, the shift amount of the touch position in the right-left direction (x-axis direction) is based on the shift amount in x coordinate between the latest touch position data A(n) and the immediately previous touch position data A(n−1). However, kth touch position data A(k) of the touch position that is initially detected to be moved onto the upper scroll instruction region 53 (or the lower scroll instruction region 54) may be set as a reference, the difference in x coordinate between the touch position data A(k) indicating the reference position and the latest touch position data A(n) may be regarded as a shift amount in the x-axis direction, and this shift amount may be used as a shift amount for calculating the second speed V2. According to this method, the second speed V2 is set in accordance with a shift amount from the touch position data A(k) indicating the reference position. Thus, for example, the user can decrease the speed of scrolling by making the touch position close to the reference position indicated by the touch position data A(k), and can increase the speed of scrolling by moving the touch position away from the reference position. It is noted that the touch position data A(k) indicating the reference position may be updated at a predetermined timing. For example, the touch position data A(k) may be updated each time five items of touch position data are detected. In this case, the touch position data indicating the reference position is updated to A(k), A(k+5), A(k+10), . . . . According to this method, for example, when the user stops a pointed position, the reference position gets close to the pointed position of the user. Thus, the shift amount between the pointed position and the reference position decreases, and the speed of scrolling decreases. Therefore, when the user stops a pointed position, scroll display can be performed in which the speed of scrolling gradually decreases and the scrolling finally stops.

Further, in the above, instead of the difference in x coordinate between the touch position data A(k) indicating the reference position and the latest touch position data A(n), the length of a track on which the touch position has moved from the reference position in the x-axis direction may be used as a shift amount in the x-axis direction. In other words, a shift amount obtained by integrating the absolute value of the shift amount in x coordinate between consecutive two items of touch position data, from the touch position data A(k) indicating the reference position to the latest touch position data A(n), may be used. Specifically, this shift amount is calculated by integrating the absolute value of each shift amount in x coordinate, A(k+1)−A(k), A(k+2)−A(k+1), . . . , A(n)−A(n−1). According to this method, the shift amount is added even when the touch position reciprocates in the right-left direction. Thus, even when a range where a drag operation is possible in the right-left direction is small, it is possible to increase the value of the speed V2 of scrolling that is set in accordance with a shift amount. It is noted that the touch position data A(k) indicating the reference position may be updated at a predetermined timing. For example, when the length of a track exceeds a predetermined threshold, the speed V2 of scrolling may be set in accordance with the length of the track, and the touch position data A(k) indicating the reference position may be updated to the latest touch position data A(n) at that time.

Further, in the embodiment described above, the determination as to whether or not the touch position shift in the right-left direction (x-axis direction) on the upper scroll instruction region 53 (or the lower scroll instruction region 54) is based on whether or not the shift amount in x coordinate between the latest touch position data A(n) and the immediately previous touch position data A(n−1) exceeds the predetermined threshold. In other words, scroll display is performed at a predetermined speed on the basis of whether or not the touch position has shifted in the right-left direction at a predetermined speed or higher. However, the exemplary embodiments disclosed herein are not limited thereto, and, for example, scroll display may be performed when it is determined that a shift of the touch position in the x-axis direction from the reference position exceeds a threshold.

Further, in the embodiment described above, the speed V1 of scrolling in the downward direction is set in accordance with the magnitude of the shift amount by which the touch position has shifted from the lower edge of the selection operation region 52 (the boundary between the selection operation region 52 and the lower scroll instruction region 54) in the y-axis negative direction (downward direction). However, the exemplary embodiments disclosed herein are not limited thereto, and, for example, the speed V1 of scrolling in the downward direction may be set in accordance with the length of a track on which the touch position has moved from a predetermined reference position in the y-axis direction on the lower scroll instruction region 54.

Further, in the embodiment described above, when scroll display is performed in the up-down direction, the speed V2 of scrolling is calculated on the basis of the shift amount of the touch position in the right-left direction. However, the exemplary embodiments disclosed herein are not limited thereto, and, for example, in an embodiment where scroll display is performed in the right-left direction, a speed V2 of scrolling in the right-left direction may be calculated on the basis of a shift amount of the touch position in the up-down direction.

Further, in the embodiment described above, the speed of scrolling is calculated on the basis of the shift amount of the touch position in the right-left direction (x-axis direction), the shift amount of the touch position in the downward direction (y-axis negative direction), and the like. However, the exemplary embodiments disclosed herein are not limited thereto, and the amount of scrolling (i.e., the width of scrolling when scrolling is performed at a predetermined timing) may be calculated on the basis of these shift amounts.

Further, in the embodiment described above, when scroll display is performed in the up-down direction (y-axis direction), the speed V2 of scrolling is calculated on the basis of the shift amount of the touch position in the right-left direction (x-axis direction). However, when scrolling is performed in the y-axis direction, the speed of scrolling does not necessarily have to be calculated on the basis of a shift component in the x-axis direction orthogonal to the y-axis direction, and may be calculated on the basis of a shift component in a direction different from the y-axis direction. The range of the angle between the x-axis direction and the direction different from the y-axis direction is preferably from −45 degrees to +45 degrees.

Further, in the embodiment described above, the case where the touch panel 13 is used as input means has been described as an example. However, the input means is not limited to the touch panel 13, and may be, for example, a mouse, a joystick, a touch pad, or the like.

Further, in the embodiment described above, the case where the scroll target image of the exemplary embodiments disclosed herein is a text has been described as an example. However, the scroll target image of the exemplary embodiments disclosed herein may be another image, a character, a sign, or the like.

Further, in the embodiment described above, the case where the touch panel 13 is provided integrally to the game apparatus 10 has been described as an example. However, it is understood that the exemplary embodiments disclosed herein can be realized even if the game apparatus 10 and the touch panel are separately provided. In addition, the touch panel 13 may be provided on the upper LCD 22, and the aforementioned image displayed on the lower LCD 12 may be displayed on the upper LCD 22.

Further, in the embodiment described above, the case where the hand-held game apparatus 10 is used has been described. However, the exemplary embodiments disclosed herein may be realized by an information processing apparatus, such as a general personal computer, executing the information processing program of the exemplary embodiments disclosed herein. In another embodiment, instead of such a game apparatus, any hand-held electronic apparatus such as a PDA (Personal Digital Assistant), a mobile phone, or a personal computer may be used.

Further, in the above description, the case where the game apparatus 10 performs all the steps of the information processing has been described as an example. However, another apparatus may perform at least a part of the steps of the information processing. For example, in the case where the game apparatus 10 is connected to another apparatus (for example, a server or another game apparatus) so as to be able to communicate with the other apparatus, the game apparatus 10 and the other apparatus may cooperate with each other to execute the steps of the information processing. In addition, in the embodiment described above, the information processing section 31 of the game apparatus 10 executes the predetermined program, whereby the processing shown in the flowcharts described above is performed. However, a dedicated circuit included in the game apparatus 10 may perform a part or all of the steps of the processing.

Further, the shape of the game apparatus 10 described above, and the shapes, the numbers, the installed positions, and the like of the various operation buttons 14, the analog stick 15, and the touch panel 13 provided in the game apparatus 10, are merely an example. It is understood that the exemplary embodiments disclosed herein can be realized with other shapes, numbers, and installed positions. In addition, the order of steps, setting values, values for the determinations, and the like used in the aforementioned information processing are merely an example. It is understood that the exemplary embodiments disclosed herein can be realized with other orders and values.

Further, instead of supplying the above information processing program to the game apparatus 10 via an external storage medium such as the external memory 45 or the external data storage memory 46, the information processing program may be supplied to the game apparatus 10 via a wired or wireless communication line. In addition, the information processing program may previously be stored in a nonvolatile storage device in the game apparatus 10. It is noted that instead of a nonvolatile storage memory, a CD-ROM, a DVD, a similar optical disc storage medium, a flexible disc, a hard disc, an optical magnetic disc, a magnetic tape, or the like may be used as an information storage medium for storing the information processing program. In addition, a volatile memory for temporarily storing the information processing program may be used as an information storage medium for storing the information processing program.

While certain exemplary embodiments have been described in detail, the foregoing description is in all aspects illustrative and not restrictive. It will be understood that numerous other modifications and variations can be devised without departing from the scope of the certain exemplary embodiments.

What is claimed is:

1. A non-transitory computer-readable storage medium having stored therein an information processing program executed by a computer of an information processing apparatus which includes a scroll image display region for displaying a scroll target image, the scroll image display region including a first region, the information processing program causing the computer to perform operations comprising:
    sequentially detecting a pointed position in a second region located in a first direction from the first region, or in a third region located in a second direction opposite the first direction from the first region;
    determining whether the detected pointed position shifts in the second region or the third region in a direction different from the first direction and the second direction; and
    scrolling the scroll target image, (a) in the first direction when the detected pointed position shifts in the second region in a direction different from the first direction and the second direction, and (b) in the second direction when the detected pointed position shifts in the third region in a direction different from the first direction and the second direction,
    wherein the first region is a region for providing a different instruction than a scroll instruction for scrolling the scroll target image.

2. The non-transitory computer-readable storage medium according to claim 1, wherein
    the information processing program further causes the computer to perform further operations:
    setting a scrolling amount by which the scroll target image is to be scrolled in the first direction;
    setting the scrolling amount on the basis of a shift amount by which the detected pointed position has shifted in the second region in the direction different from the first direction and the second direction; and
    scrolling the scroll target image in the first direction by the set scrolling amount.

3. The non-transitory computer-readable storage medium according to claim 2, wherein the operations further include:
    setting a scrolling amount by which scrolling is to be performed per unit time, on the basis of a shift amount by which the detected pointed position has shifted in the second region in the direction different from the first direction and the second direction; and
    scrolling the scroll target image in the first direction by the set scrolling amount, per unit time.

4. The non-transitory computer-readable storage medium according to claim 2, wherein the operations further include setting the scrolling amount in accordance with a length of a track on which the detected pointed position has moved in the second region from a predetermined reference position in the direction different from the first direction and the second direction.

5. The non-transitory computer-readable storage medium according to claim 2, wherein the operations further include setting the scrolling amount in accordance with a shift amount by which the detected pointed position has shifted in the second region from a predetermined reference position in the direction different from the first direction and the second direction.

6. The non-transitory computer-readable storage medium according to claim 2, wherein the operations further include setting the scrolling amount in accordance with a shift amount by which the detected pointed position has shifted in the second region in the direction different from the first direction and the second direction within a predetermined time.

7. The non-transitory computer-readable storage medium according to claim 1, wherein the determining includes determining whether the detected pointed position has shifted in the second region in the direction different from the first direction and the second direction within a predetermined time by an amount exceeding a predetermined threshold.

8. The non-transitory computer-readable storage medium according to claim 1, wherein the direction different from the first direction and the second direction is a direction orthogonal to the first direction.

9. An information processing system comprising:
a display which includes a scroll image display region for displaying a scroll target image, the scroll image display region including a first region; and
a processing system including at least one processor, the processing system configured to perform operations comprising:
sequentially detecting a pointed position in a second region located in a first direction from the first region, or in a third region located in a second direction opposite the first direction from the first region;
determining whether the detected pointed position shifts in the second region or the third region in a direction different from the first direction and the second direction; and
scrolling the scroll target image, (a) in the first direction when the detected pointed position shifts in the second region in a direction different from the first direction and the second direction, and (b) in the second direction when the detected pointed position shifts in the third region in a direction different from the first direction and the second direction,
wherein the first region is a region for providing a different instruction than a scroll instruction for scrolling the scroll target image.

10. A non-transitory computer-readable storage medium having stored therein an information processing program executed by a computer of an information processing apparatus which includes a scroll image display region for displaying a scroll target image, the scroll image display region including a first region, the information processing program causing the computer to perform operations comprising:
sequentially detecting a pointed position in a second region located in a first direction from the first region, or in a third region located in a second direction opposite the first direction from the first region;
determining whether the detected pointed position shifts in the second region or the third region in a direction different from the first direction and the second direction; and
scrolling the scroll target image, (a) in the first direction when the detected pointed position shifts in the second region in a direction different from the first direction and the second direction, and (b) in the second direction when the detected pointed position shifts in the third region in a direction different from the first direction and the second direction,
wherein, in response to determining that a detected pointed position shifts in the first region, an operation different from scrolling the scroll target image is performed without scrolling the scroll target image.

11. An information processing system comprising:
a display which includes a scroll image display region for displaying a scroll target image, the scroll image display region including a first region; and
a processing system including at least one processor, the processing system configured to perform operations comprising:
sequentially detecting a pointed position in a second region located in a first direction from the first region, or in a third region located in a second direction opposite the first direction from the first region;
determining whether the detected pointed position shifts in the second region or the third region in a direction different from the first direction and the second direction; and
scrolling the scroll target image (a) in the first direction when the detected pointed position shifts in the second region in a direction different from the first direction and the second direction, and (b) in the second direction when the detected pointed position shifts in the third region in a direction different from the first direction and the second direction,
wherein, in response to determining that a detected pointed position shifts in the first region, an operation different from scrolling the scroll target image is performed without scrolling the scroll target image.

12. A non-transitory computer-readable storage medium having stored therein an information processing program executed by a computer of an information processing apparatus which includes a scroll image display region for displaying a scroll target image, the scroll image display region including a first region, the information processing program causing the computer to perform operations comprising:
sequentially detecting a pointed position in a second region located in a first direction from the first region, or in a third region located in a second direction opposite the first direction from the first region;
determining whether the detected pointed position shifts in the second region or the third region in a direction different from the first direction and the second direction; and
scrolling the scroll target image, (a) in the first direction when the detected pointed position shifts in the second region in a direction different from the first direction and the second direction, and (b) in the second direction when the detected pointed position shifts in the third region in a direction different from the first direction and the second direction,
wherein the second region is located in the first direction from the first region and has substantially rectangular shape in which the first direction is the shorter side direction.

13. An information processing system comprising:
a display which includes a scroll image display region for displaying a scroll target image, the scroll image display region including a first region; and
a processing system including at least one processor, the processing system configured to perform operations comprising:
sequentially detecting a pointed position in a second region located in a first direction from the first region, or in a third region located in a second direction opposite the first direction from the first region;
determining whether the detected pointed position shifts in the second region or the third region in a direction different from the first direction and the second direction; and
scrolling the scroll target image, (a) in the first direction when the detected pointed position shifts in the second region in a direction different from the first direction and the second direction, and (b) in the second direction when the detected pointed position shifts in the third region in a direction different from the first direction and the second direction,
wherein the second region is located in the first direction from the first region and has substantially rectangular shape in which the first direction is the shorter side direction.

\* \* \* \* \*